US006094795A

United States Patent [19]

Davenport

[11] Patent Number: 6,094,795

[45] Date of Patent: Aug. 1, 2000

[54] ROTARY SHEAR

[76] Inventor: Ricky W. Davenport, P.O. Box 52154, Lafayette, La. 70505-2154

[21] Appl. No.: 09/337,948

[22] Filed: Jun. 22, 1999

Related U.S. Application Data

[62] Division of application No. 08/897,296, Jul. 21, 1997, Pat. No. 5,971,305.

[51] Int. Cl.[7] .......................... B23Q 17/00; G01M 19/00

[52] U.S. Cl. .......................... 29/407.1; 241/197; 241/243; 241/294; 241/295; 241/300; 29/401.1

[58] Field of Search .............................. 29/401.1, 407.01, 29/407.05, 407.1; 241/27, 30, 197, 280, 281, 282, 293, 294, 295, 300, 243

[56] References Cited

U.S. PATENT DOCUMENTS 5,094,392 3/1992 Szombathy .
5,402,948 4/1995 Kaczmarek .
5,402,950 4/1995 Blair et al. .
5,509,613 4/1996 Page .
5,775,608 7/1998 Dumaine et al. .
5,785,263 7/1998 Wu et al. .
5,819,825 10/1998 Lyman et al. .

*Primary Examiner*—David P. Bryant
*Assistant Examiner*—Jermie E. Cozart
*Attorney, Agent, or Firm*—Robert N. Montgomery

[57] ABSTRACT

A slow speed, high torque shear technology is disclosed having optional configurations and attachments for its construction and methods for reconfiguring existing shears to improve performance, and maintenance economics. A method is provided for the readily replacement of individual cutters and tooth modules, reconfiguration of cutter and tooth assemblies in a mix and match manner, in combination with matching anvils having replacement cutting elements with multiple cutting faces. Alternative embodiments are provided illustrating methods of configuration of various types of cutting elements and material feed systems. Methods for converting a rough cut shear to a fine particle shear and then to a granulator as well as a method for rejecting unprocessable material is also disclosed.

18 Claims, 24 Drawing Sheets

ROTARY SHEAR

This is a divisional application of U.S. Pat. application Ser. No. 08/897,296 filed Jul. 21, 1997 now U.S. Pat. No. 5,971,305.

SPECIFICATION

1. Field of the Invention

The present invention relates to rotary shears and shredders in general and more particular to high volume shredders used to shred waste material and being of a type having high torque, slow speed, and capable of producing small particle size materials in a single pass.

2. General Background

Typically, modular or slow speed shear shredders utilize a series of intermeshing cutting faces which shear material as it is captured by the cutters and pulled through the machine. Examples of such machines are taught by U.S. Pat. Nos. 5,402,950, 3,931,935, 5,145,120, 4,119,277 4,690,337, 4,925,116, 5,062,576, 5,094,392, 5,248,100, and 5,402,948. Cutters, generally are of two types (1) teeth attached and arrayed around a rotatable cylindrical core or (2) comprised of heavy steel plates stacked on a mandrel. In either case the teeth shear material by shearing such material between an anvil and the tooth or between counter-rotating, intermeshing disk. It is this arrangement of teeth and the associated anvil and/or the configuration of intermeshing disk which determines the efficiency and particle size of the materials passing through the machines. During operation, the cutter's teeth are subjected to abrasion and wear from their shearing of material. The shear's teeth or hooks as they are sometimes called tend to round off along the cutting edges due to abrasion and wear. When this happens, the gap between intermeshing disks and/or anvils begins to open wider until the hooks or teeth are no longer capable of grabbing the infeed material effectively. The cutters begin to rip and tear instead of shearing and it often becomes necessary to replace the entire set of cutters in order to restore the performance of the shear machine. Excessive wear and damage to the cutters is a constant problem. Therefore, various apparatus have been employed to help alleviate such problems as can be seen in the '337 and '100 patents which employ movable anvils, while other such as the U.S. Pat. Nos. 4,946,109, 5,507,441, or '277, '950, and '948 patents utilize replaceable cutter face blade or element. The '948 patent provides a cutter bar having a plurality of carbide cutter elements along its length. In such cases where insertable cutting teeth are used, the arrangement and configuration of the teeth are restricted to a particular type and size due to their contact with a fixed anvil. In cases where replaceable inserts are used they are generally restricted to the face or edges of the cutter and are held in position with bolts or brazed to the cutter tooth. Such arrangements bring the bolt heads in direct contact with the material being sheared, resulting in lost inserts and/or making it difficult to remove the bolts for replacement.

Disk type, slow speed, shredders often require spacer disk between the cutter disk and a series of cleaning fingers to dislodge material build-up between the cutter disk. Other problems associated with this type shredder include shaft fracture due to large objects being pulled between a pair of counter rotating disk. To overcome such problems hydraulic drives and load sensors have been developed such as that disclosed in the '100, and '948 patents. However, in such cases the systems fail to address the need.

As mentioned above, in most cases slow speed, shredders pull material into the machine with the shredder teeth or the material is feed by a rotary feeder units such as that taught by the '948 patent or to conveying systems like that disclosed by the '277 patent. However, such feeders are usually limited to small particles or simply serve to feed the material to the cutters. No attempt has been made to force feed materials to the cutters or to presize the material.

It is known within the shredder art that a center anvil, such as is taught by the '392 patent, may be employed to assist in shredding which may also prevent material jams between the cutters and thus prevent rotating shaft fracture. However, the '392 patent relies on a one piece unitized construction for its rotating cutters. There is also no provision made for replacement of the cutter teeth or wear surfaces of the cutter teeth or anvil.

Replacing cutters in shear shredders having cutters permanently attached to its rotating members requires complete disassembly of the shredder. Typically, replacement cutter assemblies plus the labor to install them is a very expensive procedure even for a small machine and much more costly for a large one. Therefore, one of the major drawbacks associated with shear shredder operation is the high cost of maintaining the equipment. Further, shear shredders tend to cut material into long strips. In cases where particle size is important, it becomes necessary to classify the shredded material and route all oversized material back through the shredder repeatedly until it is properly sized to exit the classification system. This repeated passing of material through a single shredder lowers the shredder's processing capacity and decreases the life of the cutters. The only alternative would be to simply stack shear shredders so that material can cascade through a number of shredders having increasingly narrower cutters. Usually, the capital cost of multiple shredders prohibits this approach. Therefore there is a need for a more efficient shredder system in which; the particle size can be controlled, the cutter teeth can be replaced readily, tooth configuration can be changed rapidly, and older machines can be rebuilt, incorporating new and improved efficient concepts at an economical cost.

SUMMARY OF THE PRESENT INVENTION

The rotary shredder technology disclosed herein is applicable to high torque, slow speed, high volume type shredding machines which reduces material, to a consistent, small particle size, in a single pass. Unlike conventional low speed, shear shredders, the instant technology utilizes a shearing principal which enables the direct reduction of bulk material without the need for recirculation of the material through a shredder for particle sizing. A basic shredding machine may be reconfigured as a fine rotary shredder, coarse rotary shredder, conventional shear shredder, or granulator all by simply changing anvil and rotor components.

As in most such shredders material is sheared as it is pinched between the revolving teeth and a stationary anvil. However the present technology provides for the shear's rotating members, (rotor/hub), comprising, a number of teeth along the rotor's length, to be sized to yield a desired particle size with a single pass through the anvil. This arrangement eliminates the need to classify and recycle material through the shredder. The cutting teeth of the rotor and the anvil are furnished with mining grade tungsten carbide inserts. These teeth inserts are mated to individual tool or element holders in a manner whereby they can be easily and quickly replaced with the removal of a single bolt. The tool or elements, generally, are carbide inserts which provide the best wear properties of any material available and last several times longer than typical tool steel used in most shredders. The present shredder design provides all wear components with individually replaceable parts which are economical to purchase, easy to replace, and specifically designed for shear applications. This approach extends the usable life of the components and allows for a simple and cost effective method for maximizing shredder performance thus minimizing shredder down time. The present technology further allows existing rotary shredders to be restored to factory performance without the need for complete disassembly and at a fraction of the cost of a typical shear shredder.

The technology further comprises a modular design which allows for a variety of configurations within the same machined, hub body. The rotor assembly, for example, is made up of a series of modular rotor segments or hubs which may be arranged in a variety of ways to provide teeth stagger and tooth configuration. The rotor or its segments are made from high tinsel, alloy steel which are heat treated to provide a hardened wear surface. The rotor assembly may comprise hub sections stacked on a common shaft, compressed together by a clamping assembly 63 to produce a single rigid structure. Each rotor hub section having a series of pockets which serve as mounting points for tooth insert holders. The rotor insert holders having carbide teeth attached are mated to the rotor in a tapered fit manner and held into position by a single bolt passing longitudinally through the holder. Tooth holder are easily removed from the rotor by screwing a bolt into the single mounting hole and jacking it out of its tapered cavity. Larger teeth may be made from hardened tool steel which do not utilize tungsten carbide inserts. Finally, the teeth can be configured to yield a square or rectangular particle as well as a triangular particle by varying the shape of the teeth bolted to the rotor. The anvil portion of the shear configured to mate with each tooth and can likewise be varied to yield rectangular or triangular particles. However, certain configurations may not require that a tooth be located in each position on the rotor section. In such cases, a plug is bolted in the tapered rotor cavity to protect the pocket and preserve its integrity. An alternate means of constructing the rotor may be accomplished by stacking a series of cutting disks and spacers on a rotatable rotor shaft, configured to yield the required configuration. However, in most cases the anvils construction would remain the same. Shredders may be fitted with any number of screens which fit around the bottom half of the rotor. These screens provide further particle sizing and reduction since material cannot pass through the screen openings until it is properly sized. However, the present technology provides additional sizing capability by installing a system of blocks or bars adjacent the screen openings which are in close proximity to the rotor's teeth.

The invention further provides for dual shaft rotary shredders which utilize two rotors configured as described above except both rotors rotate towards the center of the machine. In this case a single stationary anvil is located in the center of the machine so that both rotors have teeth passing through notches in a single anvil. The improvement of the present technology being an anvil having replaceable, segmented tool holders or carbide cutting faces. In dual rotary shears, the teeth in both rotors bite into the infeed material and pull it into the center of the machine. Individual particles are then produced as rotor teeth capture chunks of material and shear it against a stationary anvil. Dual shafted machines are preferred for large or bulky items because of their high capacity and self feeding characteristics.

Single shafted rotary shears are generally configured in a similar fashion as the dual shafted machines. In which case the stationary anvil is located against one side of the shredder frame, but its operation is identical.

The present technology further provides shredders which provide coarse shredding of materials. In this case, the typical rotor segments are supplied with large triangular shaped cutting tooth mounts which are a permanent part of the rotor segment. The front or face of the mounts are fitted with replaceable cutting inserts. These teeth pass perpendicular through a notch in segmented, stationary anvils of similar configuration which are also equipped with replaceable inserts. With this arrangement, bulk material may be processed at a rapid rate and reduced to a consistent coarse particle size. The coarsely shredded material may then be routed to a fine shredder for further size reduction if desired.

Finally, the rotary shredder may be configured as a granulator by simply adding fine screens to the outlet side of the rotor and increasing the rotational speed of the rotor. Both single and dual shafted machines may be configured as a granulator. Existing conventional dual shaft rotary shredders may be reconfigured as high efficient, shear shredders by first removing all rotor sections from the dual shafts and installing an anvil having notches configured to mesh with the new intermeshing cutters (and spacers) stacked or otherwise installed on the new or original dual shafts. Cleaning fingers may be mounted on the side frame of the shredder which may further serve as backing support members for the shafts. These fingers prevent shaft bending and breaking which often occurs in conventional dual shaft rotary shredders. The machine will then function and perform as a high performance shear shredder in this configuration. However, any conventional shear shredder can be converted to a high efficiency rotary shredder by simply removing the cutting disks, spacers, and cleaning fingers from the shredder and replacing them as described above. The cost of this conversion is similar to the cost of rebuilding a conventional shear. After conversion, the machine will produce a consistently small particle size; it will operate much longer without the need for teeth replacement; future refurbishment can be done without lengthy disassembly; and refurbishment will be done at a fraction of the cost of conventional cutting disk replacement.

The instant technology anticipates shredders of the foregoing type to be outfitted with a hydraulic drive system. The hydraulic drive would then allow the shredder to have variable speed performance with the ability to absorb shock loads. Sensors provided in the hydraulic system would prevent jamming when an unshreddable item is encountered, the system would simply reverse the rotors to clear the obstruction, then move forward again when the obstruction is cleared. The system would be designed to repeat this cycle for a programmed number of times before warning the operator of the occurrence. Finally, a reject feature is anticipated which would allow unshreddable items to be ejected from the shredding chamber. When the rotors reverse, doors in the side frame of the shredder opens thereby allowing the unprocessable item to be ejected from the shredding chamber.

Solid materials sometimes resist being self-fed into a rotary shredder. In such cases, optional feeding systems are known which provide a positive flow of material into the rotor. However, in most cases such systems are restricted to conveyers or to metering type feeders. The instant technology provides two embodiment of a hydraulic ram feed system attachable to a rotary shear for pushing a "slug" of material into the shear. First a horizontal hydraulic ram feed is disclosed, for attachment to the shredder for feeding items such as municipal waste. Second an inclined hydraulic ram is also disclosed for feeding larger items such as whole drums of material into the shredder. In both cases, the torque delivered to the shredder via the hydraulic system would be monitored and used to control the hydraulic ram. As the torque increases, the hydraulic ram reduces its applied force to avoid overfeeding the shredder. Once a “slug” has been shredded, the ram retracts and allows another mass of material to collect in front of the ram. Then it would proceed forward at a controlled rate until all material in a hopper is consumed. This cycle continues during operation of the shredder. For tire shredding, a star feeder is recommended in lieu of a hydraulic ram. Whole tires are captured between intermeshing star shaped disks and fed downward into the rotor. Thereby, controlling the feed rate to the shredder.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DESCRIPTION OF THE PREFERRED EMBODIMENT

Figure 1:
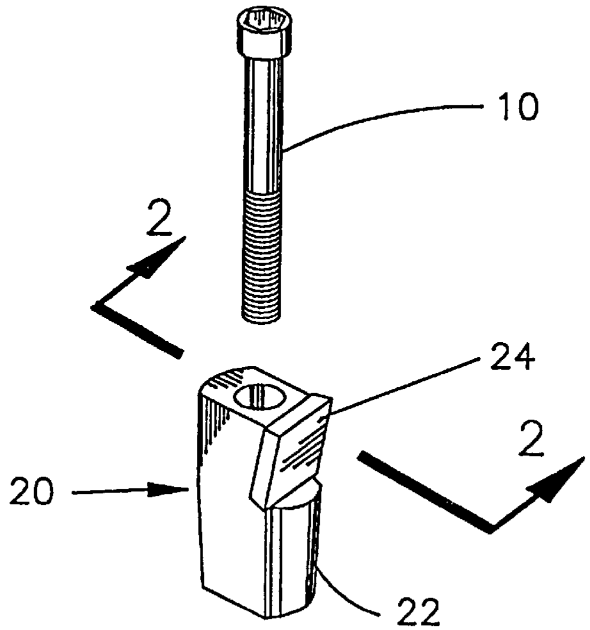
FIG. 1 is a perspective view which shows the preferred tooth assembly for a fine shredding, rotary shredder.
Figure 2:
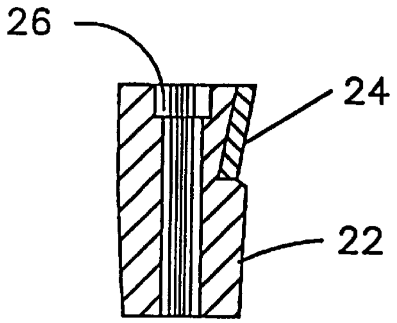
FIG. 2 is a cross sectional view of the preferred rotor tooth taken along sight line 2—2 in FIG. 1.

Referring first to FIG. 1, where a removable, rotor tooth assembly 20 is shown. The rotor tooth assembly 20 is comprised of a removable tooth body 22 which can be held to a rotor hub 50 using a single bolt 10, and a replaceable wear insert 24, such as tungsten carbide, which may be attached to the tooth body 22 through the use of screws, bolts, or solder. The wear insert 24 made be made from other materials such as hardened tool steel, ceramic or a composite. The tooth body 22 may also be constructed of hardened tool steel in a manner whereby no replaceable wear surface is necessary. The upper portion of the tooth body 22 is intended to extend beyond the major diameter of the rotor hub 50 in which it is mounted in the a manner shown in FIG. 8. The upper portion of the tooth body 22 is never wider than the replaceable wear insert 24 so that the tooth body 22 may easily pass though a stationary anvil 70 having essentially the same shape. The lower portion of the tooth body 22 is tapered from approximately its mid point to its bottom. The tooth body 22 may also be radiused on the front and rear surfaces as shown. The sides of the tooth body 22 is flat so that the tooth will fit in the rotor in only two positions: facing frontwards; or facing backwards. FIG. 2 illustrates the principle that a single bolt 10 and recessed bolt aperture 26 is all that is required to secure the tooth body 22 to a rotor hub segment 50 having a matching configuration. The recessed bolt aperture 26 may also be tapped so that a larger size bolt 10 can be threaded into the bolt aperture 26 as a means of extracting the tooth assembly 20 from its pocket. In the case of larger teeth, more than one bolt 10 may be required to secure the tooth body 22 to the rotor hub 50, but the same principles described herein apply.

Figure 3:
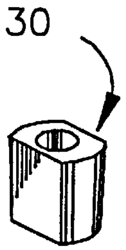
FIG. 3 is a perspective view of an alternate tooth body embodiment.
Figure 4:
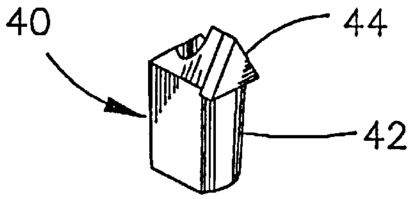
FIG. 4 is a perspective view of an alternate tooth assembly.
Figure 5:
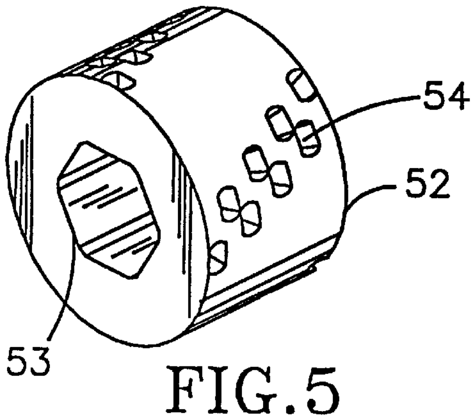
FIG. 5 is a perspective view of a typical rotor segment with milled tooth slots.
Figure 6:
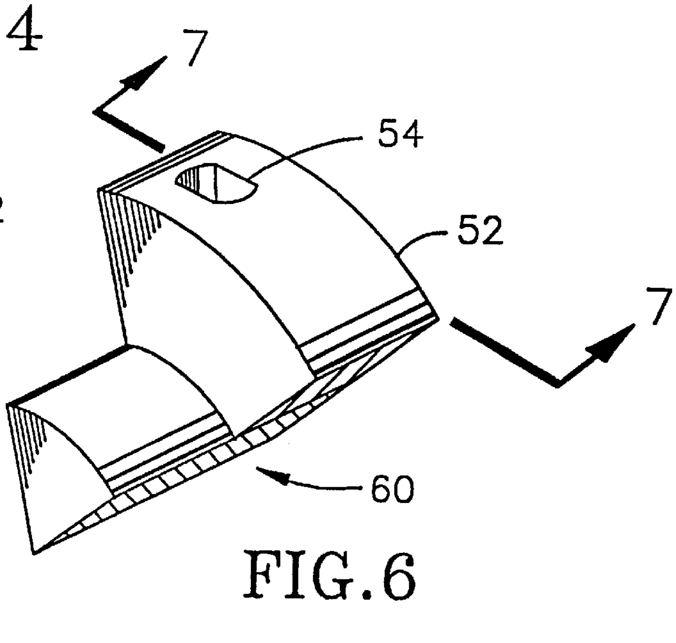
FIG. 6 is a perspective view of a portion of a rotor segment and rotor shaft.
Figure 7:
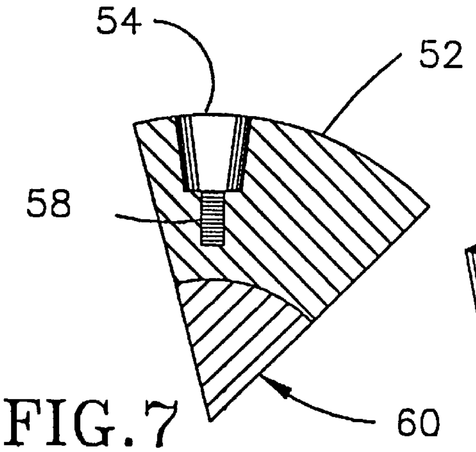
FIG. 7 is a cross-sectional view of the partial rotor/shaft segment shown in FIG. 6 taken along sight line 7—7.

FIG. 2 also illustrates that the lower portion of the tooth body 22 which inserts into the rotor hub segment 50 may be tapered from its mid point to its bottom in a manner whereby any stress load is transferred to the rotor hub segment 50 itself instead of the single mounting bolt 10. Matching bolt apertures 26 corresponding to the tooth body 22 configuration, milled into the rotor hub segment 50 may be used to attach a wide variety of removable tooth assemblies 20. FIG. 3, for example illustrates a tooth blank 30 which is used to fill a rotor tooth pocket 54 not in use and is attached in the same manner. The plug fills and protects the rotor hub's milled tooth pocket or recesses 54 as seen in FIG. 6 when not being used. As seen in FIG. 4 a rotor tooth assembly 40 utilizes a replaceable triangular wear insert 44 which is triangular in shape. As in FIG. 1 the insert is mounted to the triangular tooth body 42 having a matching configuration but which also fits in the same milled tooth recess pocket or aperture 54 on the rotor hub 50. The rotor hub segment 50 shown in FIG. 5 utilizes milled recesses 54 which match the tapered fit of the rotor tooth assemblies 20 and tooth bodies 22,30 and 42 shown in FIGS. 1–4. The matching milled tooth recesses or pockets 54 may be arranged in various staggered patterns to yield the desired material flow characteristics in a rotary shredder 1000, 1100, 1200 and 1300. Rotor hub segments 50 may be formed by machining the tooth pockets 54 and shaft opening 53 into a single metal cylinder 52. Multiple rotor hub segments 50 may be stacked on a single drive shaft 60, first shown in FIG. 6 designed to match the configuration of shaft opening 53, to yield the desired rotor length and configuration. The construction of the rotor tooth recess pocket 54 is illustrated in FIG. 6 and cross-sectional drawing labeled FIG. 7 wherein the bottom of the rotor tooth recess pocket 54 contains a single tapped hole 58 which accepts single mounting bolt 10. The mounting bolt 10 pulls the rotor tooth assembly 20 into the rotor tooth pocket 54 so that the tooth body 22 and rotor hub 50 essentially become united. The sectional view also shows that the rotor hub segment 50 and rotor drive shaft 60 are two separate components. FIGS. 1 through 7 collectively illustrate the principle of providing removable tooth pockets 54 and modular, rotor hub segments 50 to create a variety of shredding configurations from a single machine.

Figure 8:
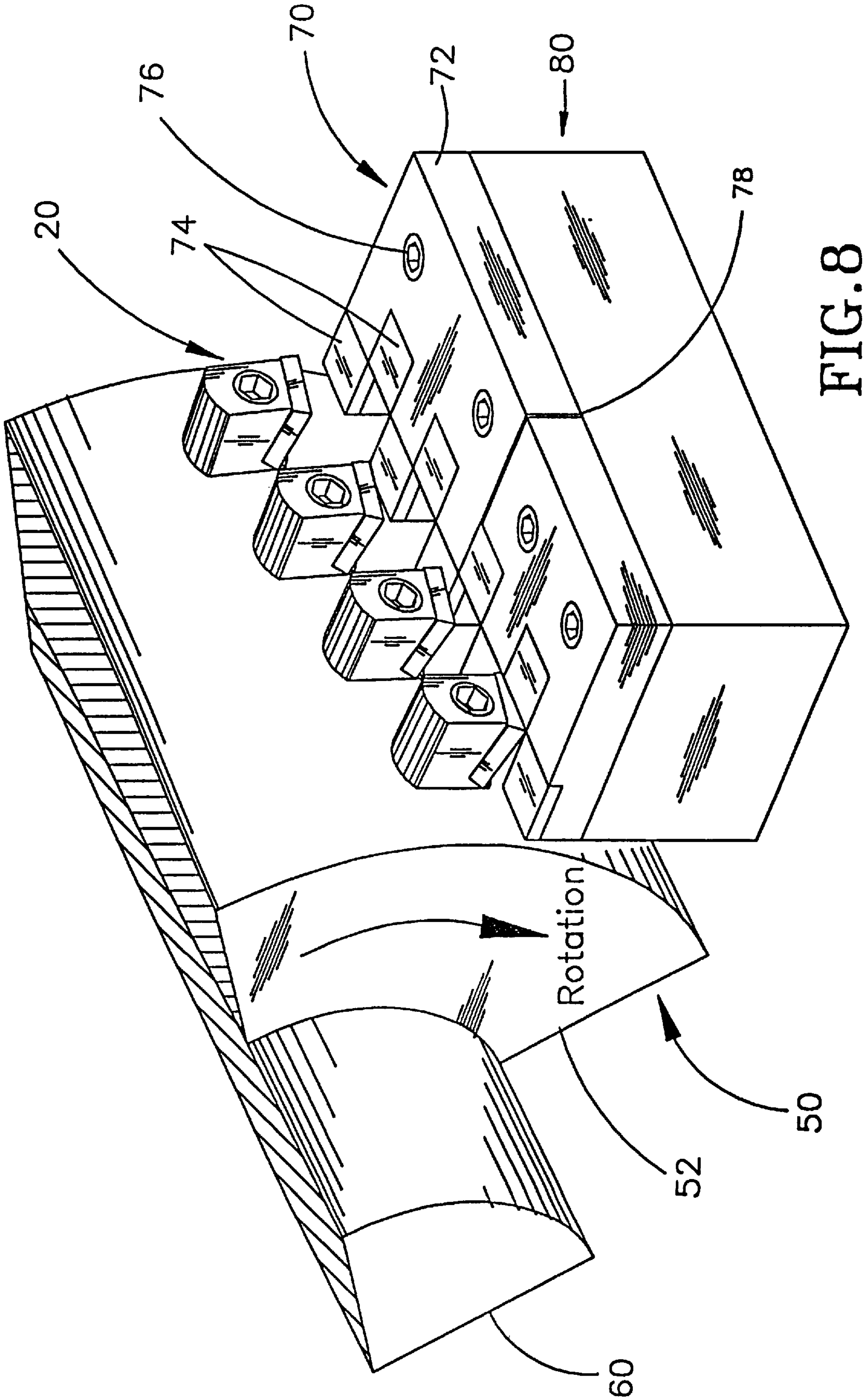
FIG. 8 is a perspective view of the rotor/shaft and anvil illustrating the operating principle of the fine shredding configuration of the rotary shredder.

FIG. 8 illustrates the operating principle of the rotary shredder 1000, 1100, 1200 and 1300. The rotary shredder 1000, 1100, 1200 and 1300 is a high torque, slow speed type shredder which has the unique ability to provide consistent particle sizing in a single shredding step. This is accomplished through the shearing of material as it is captured between the rotary tooth assembly 20 on rotor hub segment 50 and a stationary anvil assembly 70. The clearance between the openings in the anvil assembly 70 and the rotary tooth assembly 20 is approximately 10/1000 inch so that material is effectively sheared as the rotary tooth assembly 20 pushes material through the anvil assembly 70. Rotor hub segments 50 are comprised of a cored cylindrical hub 52 and is machined to stack on a common drive shaft 60 with other rotor hub segments 50. The FIG. 8 shows the general stagger of rotary teeth assemblies 20 on the rotor hub segment 50. The rotary teeth assemblies 20 can be staggered so that only one rotary tooth assembly 20 at any given time is passing through the anvil assembly 70. This arrangement reduces the power and torque required to operate the rotary shredder 1000, 1100, 1200 and 1300. Also, a single rotor hub segment 50 may contain multiple sets of rotary teeth assemblies 20 so that a single revolution of the rotor hub segment 50 may result in multiple rotary teeth assemblies 20 passing through a single position in the anvil assembly 70. Multiple sets of rotary teeth assemblies 20 generally increase the production rate of the rotary shredder 1000, 1100, 1200 and 1300.

The anvil assembly 70 is composed of a stationary anvil bed plate 80 which has replaceable anvil insert holders 72 attached to it. The bed plate 80 is mounted in the rotary shredder 1000, 1100, 1200 and 1300 and held stationary and in close proximity to the rotor hub segment 50. The wear inserts 74 are mounted at the locations where the rotary teeth 20 pass through the anvil assembly 70. The wear inserts 74 may be mounted to the anvil bed plate 80 directly using fasteners or silver solder, but in most cases, experience has found that the wear inserts 74 are best mounted to a separate plate which functions as an anvil insert holder 72. The anvil insert holder 72 is removable and it can be mounted to the anvil bed plate 80 using bolts 76. The anvil insert holder 72 is typically several rotor tooth pockets 54 wide so that several wear inserts 74 are mounted to it. The anvil insert holder's 72 position on the anvil base plate 80 is adjustable so that it can be tailored to fit the clearance requirements of the rotor teeth assemblies 20. Experience has found it most practical to bolt a series of adjustable anvil insert holders 72 to the bed plate 80 in lieu of attempting to mount them all directly without means for adjusting their position. The gap 78 between anvil insert holders 72 allows the insert holders 72 to be shifted from side to side to better match the rotor tooth assembly 20 configuration before being tightened.

The rotary shredder 1000, 1100, 1200 and 1300 utilizes wear inserts 24 and 74 which are easily replaced and can be made from a variety of wear resistant materials including tungsten carbide. The machine can be restored to new condition by simply replacing rotary teeth assemblies 20 and anvil insert holders 72 with new ones. The worn rotary teeth assemblies 20 and anvil insert holders 72 may be taken to the shop and new wear inserts 24 and 74 respectively can be placed in the assemblies 20 and 70. These assemblies 20 and 70 are then ready for reuse. All of this can be accomplished quickly without the need to completely disassemble the rotary shredder 1000, 1100, 1200 and 1300.

Figure 9:
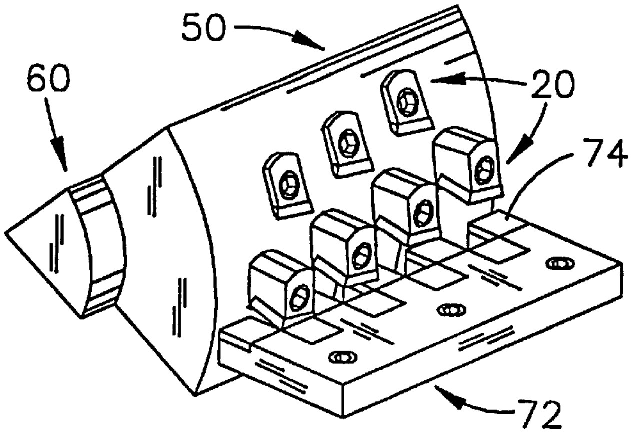
FIG. 9 is a perspective and partial view of a rotor/shaft segment and anvil configuration utilizing the tooth assembly shown in FIG. 1 in a high-low arrangement.
Figure 10:
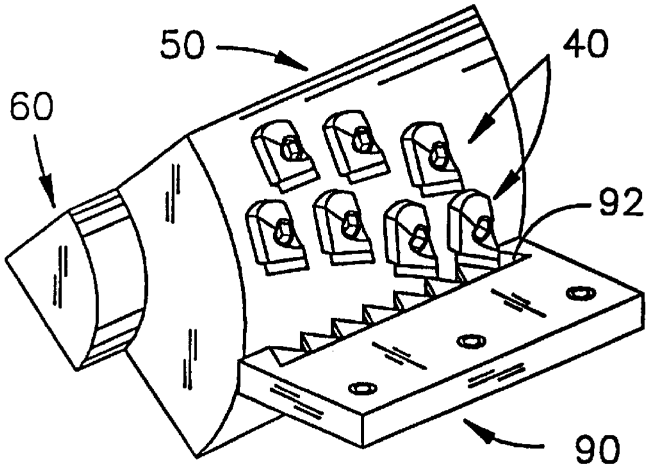
FIG. 10 is a perspective and partial view of a rotor/shaft segment and anvil configuration utilizing the tooth assembly shown in FIG. 4.
Figure 11:
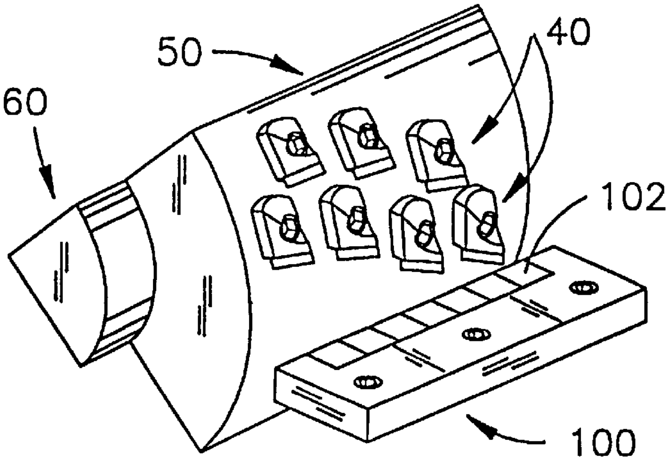
FIG. 11 is a perspective and partial view of a rotor/shaft segment and alternative anvil configuration utilizing the tooth assembly shown in FIG. 4.
Figure 12:
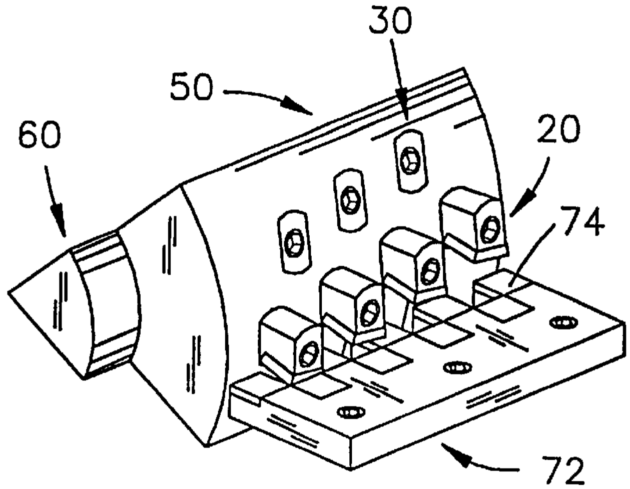
FIG. 12 is a perspective and partial view of a rotor/shaft segment and anvil configuration utilizing the tooth assembly shown in FIG. 1 using plugged tooth cavities.
Figure 13:
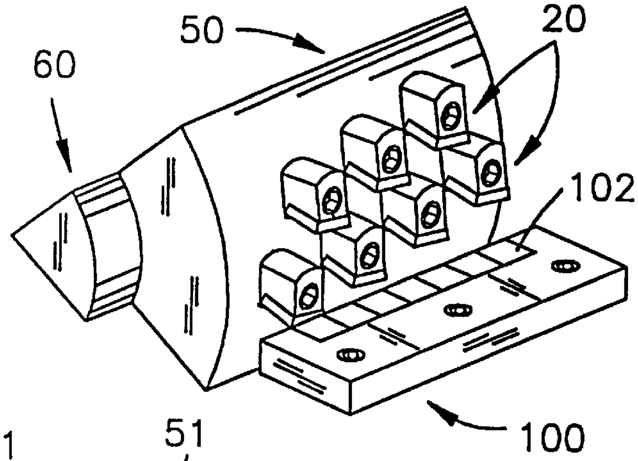
FIG. 13 is a perspective and partial view of a rotor/shaft segment and anvil configuration utilizing the tooth assembly shown in FIG. 1 in an alternative arrangement with the anvil of FIG. 11.
Figure 14:
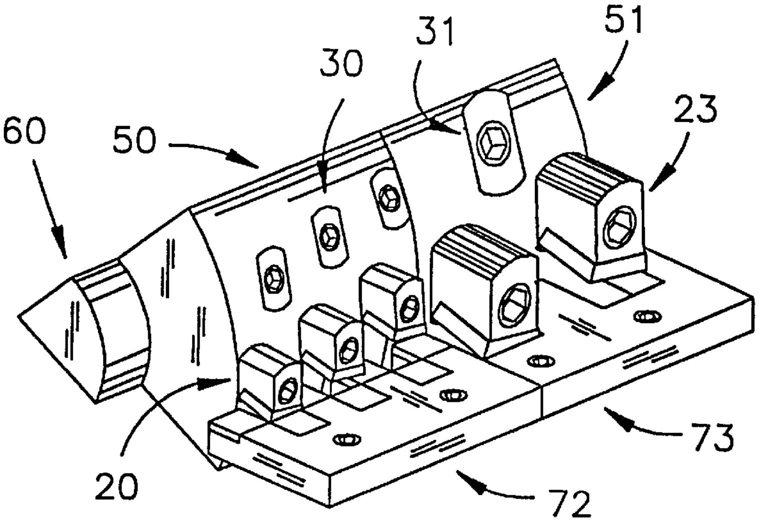
FIG. 14 is a perspective and partial view of a rotor/shaft segment and anvil configuration utilizing the tooth assembly shown in FIG. 1 in an alternative arrangement with the anvil of FIG. 12 in combination with a second segment having a larger tooth configuration.

FIGS. 9 through 14 are views of a partial rotor hub segment 50 and 51 and anvil insert holders 72, 73, 90, and 100 slidably mounted on drive shaft 60 which shows several of the many teeth configurations possible using the removable tooth principle. These FIGS. 9 through 14 include ways of providing rectangular and triangular rotor teeth assemblies 20 and 40 as well as ways for plugging or blanking 30 a tooth pocket 54 on the rotor hub segment 50 and 51. The staggered configuration of the rotary teeth assemblies 20 and 40 on the rotor hub segment 50 reduces power requirements of the rotary shredder 1000, 1100, 1200 and 1300 by passing only one rotary tooth assembly 20 through the anvil insert holders 72, 73, 90 and 100 at any moment in time. The FIGS. 9 through 14 show anvil insert holders 72, 73, 90 and 100 typically lined with tungsten carbide wear inserts 74, 92 and 102, but the principal is just as valid with anvils which do not use replaceable wear inserts 72, 73, 90 and 100. FIG. 9 shows rotary teeth assemblies 20 having rectangular wear inserts 74 at each tooth pocket position 54. With this configuration, material is sheared along the front edges of anvil insert holder 72 as well as in the rectangular tooth pockets 54 formed in the insert holder 72. FIG. 10 likewise illustrates the same rotor hub segment 50 using triangular rotor tooth assembly 40. The anvil insert holder 72 is notched to match the triangular rotor teeth assemblies 40 at each position. Triangular wear inserts 92 may be used to provide the desired anvil configuration. With this arrangement, each rotor position is shearing material. FIG. 11 illustrates the use of triangular rotor tooth assembly 40 with an anvil insert holder 100 using rectangular wear inserts 102 to form a straight edge along the rotor side of the anvil. FIG. 12 illustrates the use of tooth blank or position plugs 30 in the rotor hub segment 50 for elimination of teeth pockets 54 in the rotor hub segment 50. With this configuration, no shearing is done along the front face of the anvil insert holder 72, but rather it is done in the rectangular notches formed in the anvil insert holder 72. Plugging positions 30, for example, allows the rotary shredder 1000, 1100, 1200 and 1300 to utilize cleaning fingers at each plugged position 30 along the rotor hub segment 50. FIG. 13 illustrates the use of a rectangular rotary tooth assembly 20 at each rotor position along with an anvil insert holder 100 using rectangular wear inserts 102 to form a straight edge along the rotor side of the anvil. With this configuration, material is cut or sheared along the top edge of the rectangular rotary tooth assembly 20 only. In this respect the machine will act similar to a rotor equipped with cutting knives. Finally, FIG. 14 illustrates the flexibility of the rotary shredder principle. In this configuration, a rotor hub segment 51 having a large rectangular rotary tooth assembly 23 is located adjacent to a rotor hub segment 50 having small teeth a relatively small rectangular rotary tooth assembly 20. The teeth in each rotor hub segment 51 pass through a matching anvil (or anvil insert holder) 72 and 73. As you can see with this configuration, both coarse shredding and fine shredding can be accomplished within the same machine.

Figure 15:
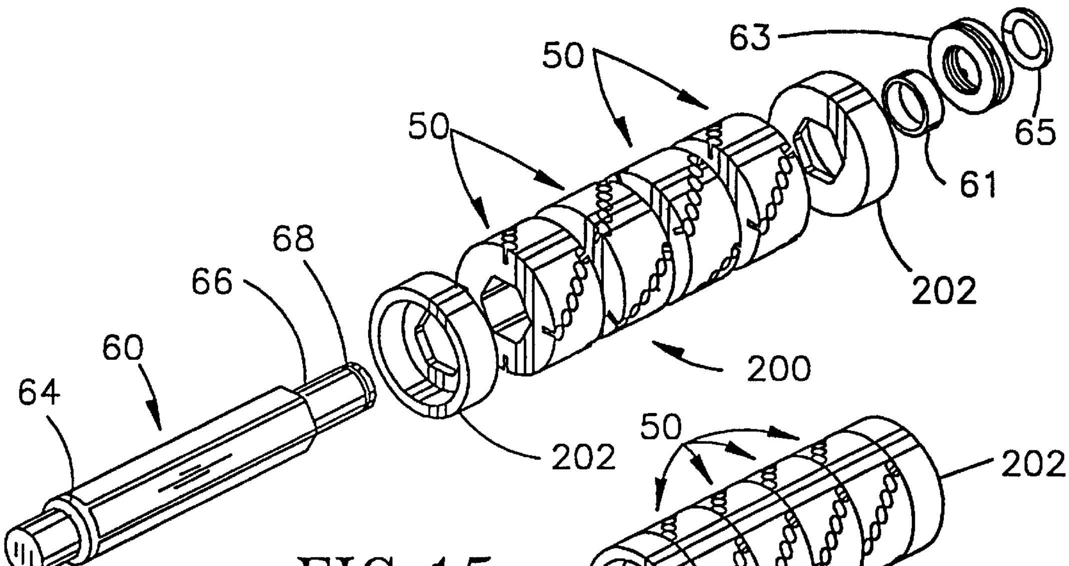
FIG. 15 is a an exploded view of a segmented rotor/shaft assembly.
Figure 16:
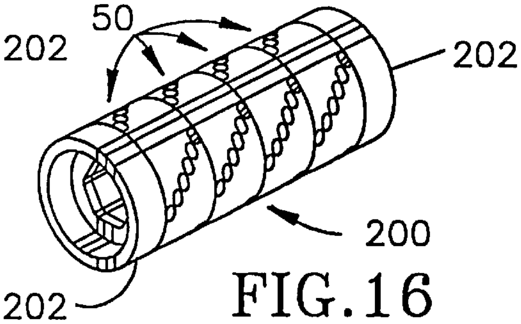
FIG. 16 is perspective view illustrating tooth patterns achievable by stacking rotor segments on the rotor shaft whereby tooth assemblies may be inserted forming parallel rows.
Figure 17:
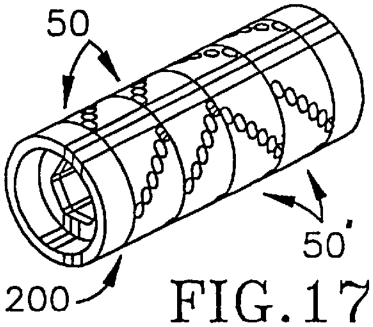
FIG. 17 is perspective view illustrating tooth patterns achievable by stacking rotor segments on the rotor shaft whereby tooth assemblies may be inserted forming parallel and perpendicular rows.
Figure 18:
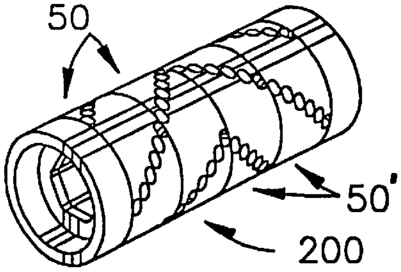
FIG. 18 is perspective view illustrating tooth patterns achievable by stacking rotor segments on the rotor shaft whereby tooth assemblies may be inserted forming parallel and perpendicular rows over two or more segments.
Figure 19:
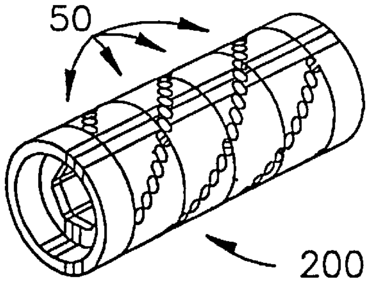
FIG. 19 is perspective view illustrating tooth patterns achievable by stacking rotor segments on the rotor shaft whereby tooth assemblies may be inserted forming parallel rows over three or more segments.
Figure 33:
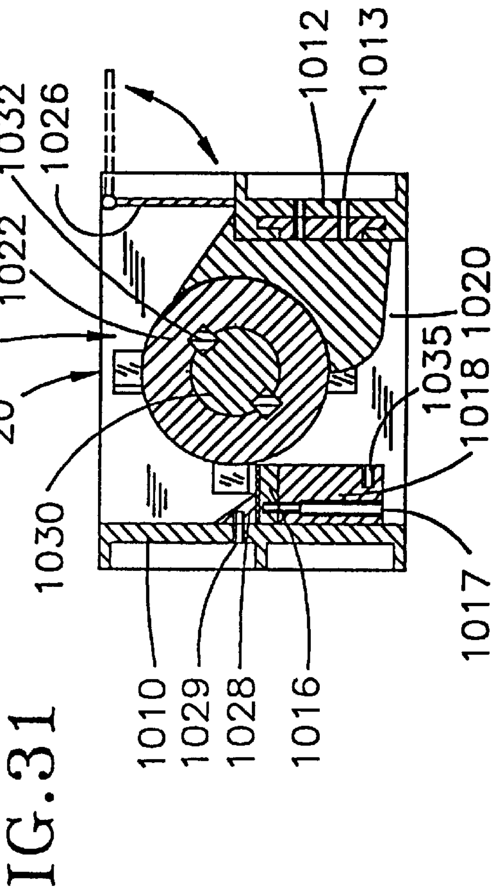
FIG. 33 is a cross-sectional views of the single rotor shredder in FIG. 31 taken along sight lines 33—33.
Figure 32:
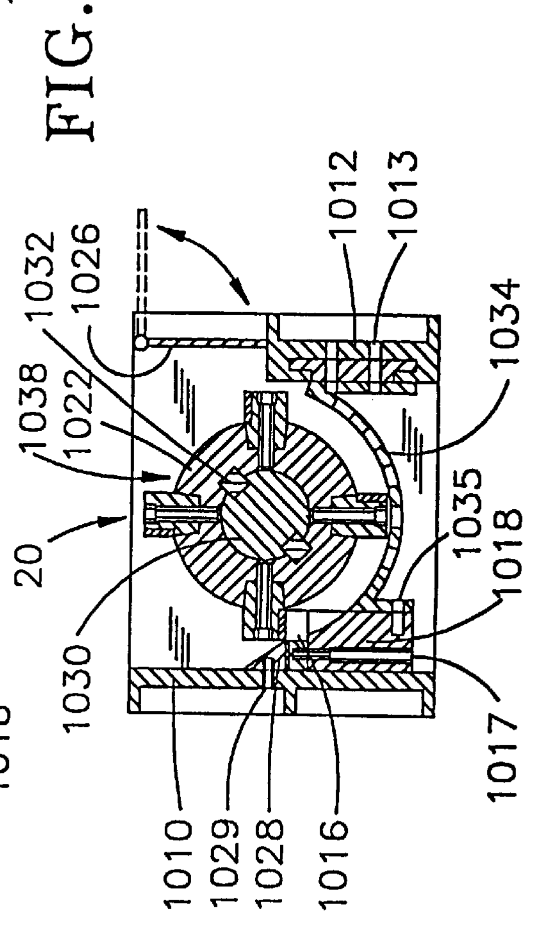
FIG. 32 is a cross-sectional views of the single rotor shredder in FIG. 31 taken along sight lines 32—32.
Figure 45:
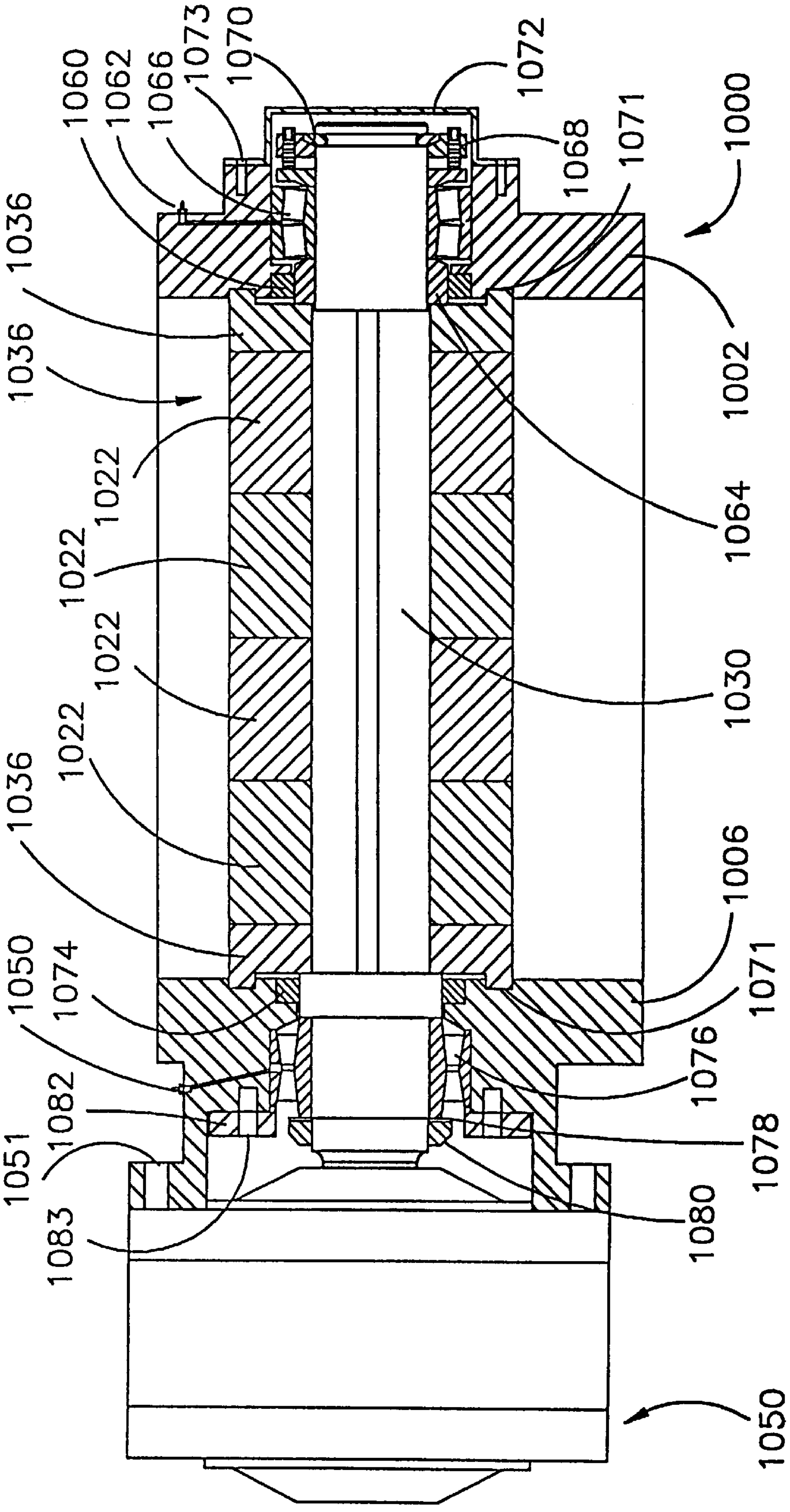
FIG. 45 is a cross-sectional view of a typical rotary shredder taken along sight line 45—45 in FIG. 31.

FIG. 15 an exploded perspective view of a rotor assembly 200 which illustrates the preferred means of configuration. The rotor assembly 200 is composed of a common drive shaft 60, rotor end pieces 202, one or more rotor hub segments 50, shaft spacer 61, clamping assembly 63, and clamping ring 65. The drive shaft 60 is configured as a hexagonal shaft having a shaft shoulder 64 against which the rotor components are stacked. The drive shaft 60 utilizes round portions 62 and 66 for location of shaft bearings as seen in FIG. 45. A groove 68 is machined in the drive shaft 60 to provide for insertion of the clamping ring 65. The shaft may also have a circular cross-section instead of a hexagonal cross section, in which case, the drive shaft 60 would have one or more slots machined into its length under the rotor segment positions as seen in FIGS. 32 & 33. The rotor segments 1022 would likewise have one or more rectangular slots machined into their length corresponding to the shaft slots. A key 1032 would then be inserted into the vacant cross section created when mating the rotor segment 1022 to the drive shaft 1030. The key 1032 would then transmit shaft torque to the rotor segments 1022 in place of using a hexagonal cross section shaft.

To assemble the rotor assembly 200, (see also cross section Assembly FIG. 45) a rotor end piece 202 would first be installed on the shaft abutting the shaft shoulder 64. Next one or more rotor hub segments 50 would be installed on the drive shaft 60. Then the second end piece 202 would be installed. Finally the shaft spacer 61, shaft bearing 1066, clamping assembly 63 and clamping ring 65 would be installed. The clamping ring 65 fits into the matching grooves 68 in the drive shaft 60. The clamping assembly 63 uses a series of bolts spaced around the perimeter of a circular disk (not shown) to expand its length along the shaft. With this arrangement, the clamping assembly 63 is caused to expand thereby compressing the rotor hub segments 50 between the shaft shoulder 64 and clamping ring 65. An alternate means of compressing the rotor hub segments 50 together may be accomplished by simply threading the shaft and screwing a large jam nut on it to compress the rotor hub segments 50 against the shoulder. Experience has found that the use of a clamping assembly 63 described above is much more effective at developing high compression forces needed to maintain the rotor hub segments 50 together under loaded conditions.

FIGS. 16 through 20 illustrate several of the many rotor configurations possible by stacking the same rotor hub segments 50 on the drive shaft 60 in a different pattern. It has been found that the pattern of rotary teeth assemblies 20 projecting from the surface of the rotor hub segments 50 tend to act similar to flights in a screw conveyor. The configurations shown in FIGS. 16 and 19, for example, will continuously convey material towards one end of the rotor assembly 200 as it rotates. The configurations shown in FIGS. 17 and 18 will continuously convey material to the center of the rotor assembly 200 as it rotates. This knowledge may often be useful when configuring a rotary shredder 1000, 1100, 1200 and 1300. For example, a rotary shredder 1000, 1100, 1200 and 1300 using two different size rotor teeth assemblies 20 may operate best using a configuration which will move material from the coarse end of the rotary shredder 1000, 1100, 1200 and 1300 to the fine end.

Figure 20:
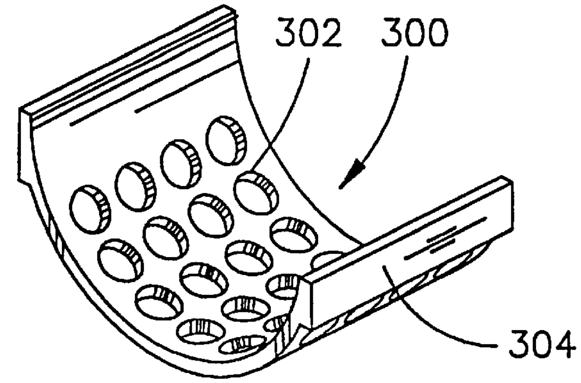
FIG. 20 is a perspective view of a typical screens used to further regulate the particle size produced by the rotary shredder.
Figure 21:
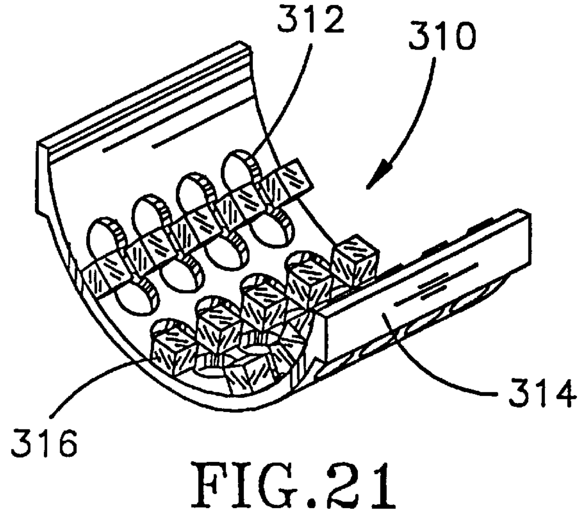
FIG. 21 is a perspective view of a screen used to further regulate the particle size produced by the rotary shredder, utilizing a set of shear blocks for further particle reduction.
Figure 22:
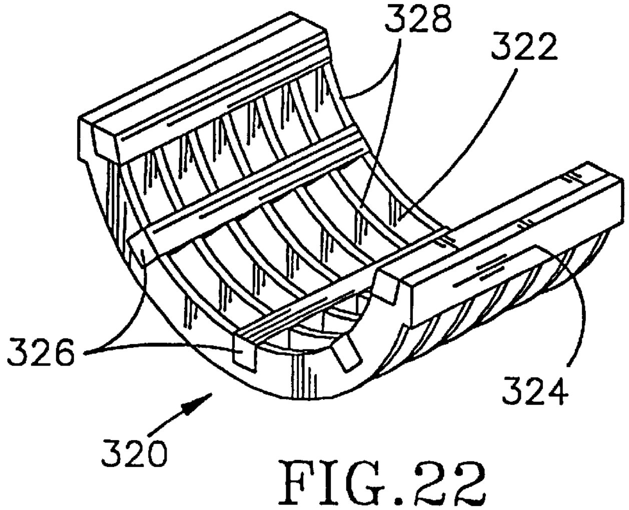
FIG. 22 is a perspective view of an alternative screen used to further regulate the particle size produced by the rotary shredder, utilizing a set of shear bars for further particle reduction.

FIGS. 20 through 22 illustrate various screen configurations which can be used in conjunction with a rotary shredder 1000, 1100, 1200 and 1300 to provide further particle sizing of material after passage of the material through the anvil assembly 70. Screens 300 and 310 are typically used when configuring a rotary shredder as a granulator for fine particle size production. In all cases, the screens 300 and 310 are positioned in the shredder on the lower side of the rotor assembly 200 so that the rotary tooth assemblies 20, 40 come in close proximity to the inside circumference of the screen 300. Material passing through the rotary shredder 1000, 1100, 1200 and 1300 is reduced as it is caught between the rotating rotary tooth assembly 20 and the screen openings 302. Only properly sized material may pass through the screen openings 302. All other material is swept back to the top side of the rotor hub 50 where the reduction cycle is repeated until the material is sufficiently reduced to pass through the screen openings 302. Mounting is accomplished by attaching side members 304 to a rotary shredder 1000, 1100, 1200 and 1300.

Figure 31:
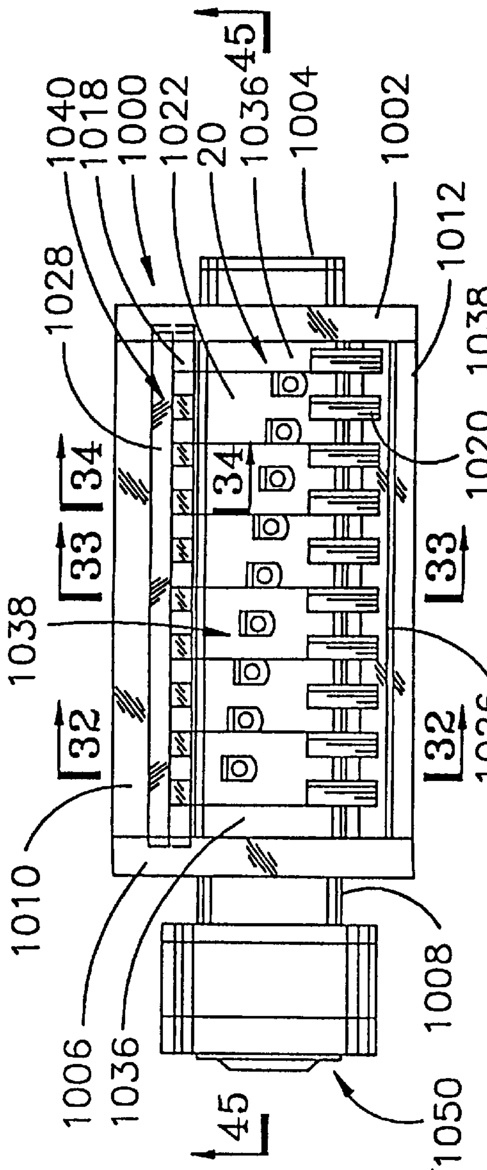
FIG. 31 is a top view of a single rotor fine shredder.

The screen 1034 as shown in FIG. 32 is typically mounted in the rotary shredder 1000 by attaching its sides to the shredder frame as seen in FIG. 31. The smaller the screen openings, the smaller the particle size produced. Also, the smaller the holes in the screen the more recirculation of material occurs thus reducing the processing capacity of the machine. FIG. 21 shows a screen 310 with perforations 312 which also has shear bars 316 attached. The shear bars 316 are located so that the rotor teeth assemblies 20 and 40 pass between them thereby increasing the amount of reduction which is occurring.

The screen 310 is similarly mounted in a rotary shredder 1000, 1100, 1200 and 1300 along sides 314. Finally, FIG. 22 illustrates a screen grate 320 constructed of a series of ribs 328 spaced a desired distance apart so that particle size is regulated by the grate spaces 322. A series of shear bars 326 stretch across the length of the screen grate 320 connecting the ribs 328 to form a rigid structure. Material is reduced as it is captured between the shear bars 326 and the rotating rotor teeth assemblies 20 and 40. Only properly sized material may pass between the grate spaces 322. Mounting is similarly accomplished by attaching side members 324 to a rotary shredder 1000, 1100, 1200 and 1300.

Figure 23:
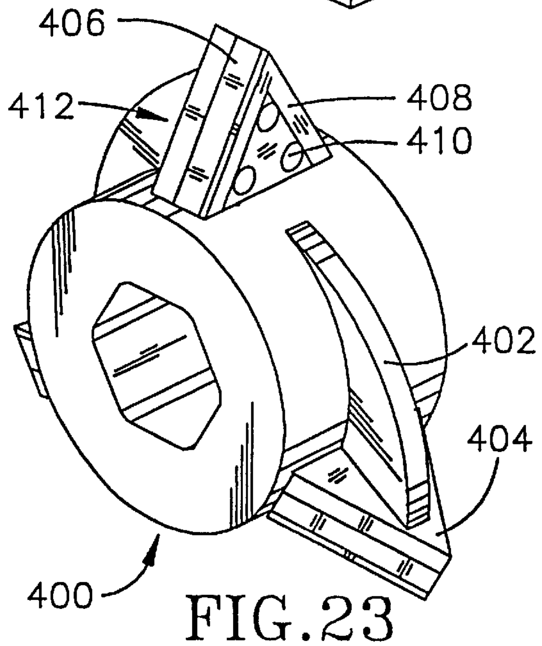
FIG. 23 is a perspective view of a coarse shredding rotor segment assembly.

FIG. 23, is a rotor segment 400 having integral teeth 412 and replaceable tooth inserts 406. With this configuration of rotor segment 400, the integral teeth 412 may be much larger than possible with the removable rotor teeth assemblies 20 and 40 depicted earlier in FIGS. 1 through 22. This arrangement utilizes a removable front tooth insert 406. The tooth insert 406 may further be lined with replaceable wear inserts 408 such as tungsten carbide along the shearing edges of the piece to increase the service life of the cutting tooth inserts 406. The wear inserts 408 may be attached to the tooth insert 406 using screws or silver solder. Experience has found that silver solder is best used to attach tungsten carbide. The integral teeth 412 are formed by using an insert bed plate 404 which is reinforced to the rotor segment 400 through gusset 402. This configuration shows the tooth insert 406 mounted to the bed plate 404 using screws 410. The mounting means may also be accomplished from the back side of the insert bed plate 404 instead of the front side if desired. FIG. 23 also shows tooth inserts 406 which are triangular in shape but rectangular and other geometric cross sections are also possible. Experience has shown that the triangular cross sectioned teeth inserts 406 penetrate material easily and thus reduce the power requirements of the shredder. For this reason, they are the preferred embodiment of tooth insert configuration. Also, the integral teeth 412 are deliberately recessed away from the outer edge of the rotor segment 400 to allow the use of cleaning fingers 800 in the rotary shredder 1000, 1100, 1200 and 1300. Cleaning fingers 800 will be described in FIG. 25.

Figure 24:
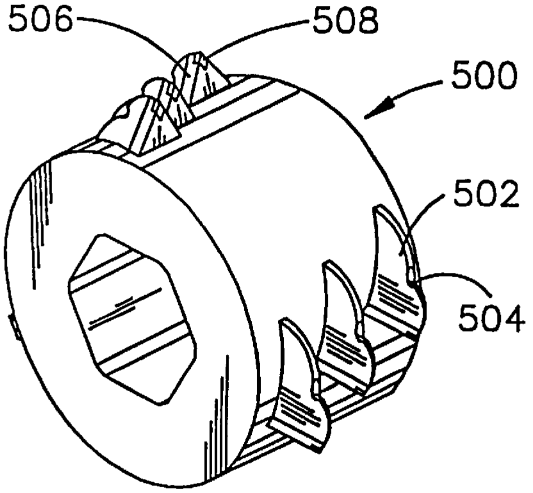
FIG. 24 is a perspective view of the rotary segment shown in FIG. 23 except with an alternate configuration.

In similar fashion, FIG. 24 shows a perspective view of a rotor segment 500 having integral teeth 502 and replaceable tooth inserts 506. This drawing shows smaller integral teeth 502 which are an integral part of the rotor segment 500. They may be fabricated and welded to the rotor segment 500 or cast as part of the rotor segment 500. Tooth insert 506 is shown to be attached to the integral teeth 502 with screws 504. The tooth inserts 506 may further be lined with replaceable wear inserts 508 such as tungsten carbide to extend the service life of the tooth insert 506. The wear inserts 508 may be attached to the tooth inserts 506 using screws or silver solder.

Figure 25:
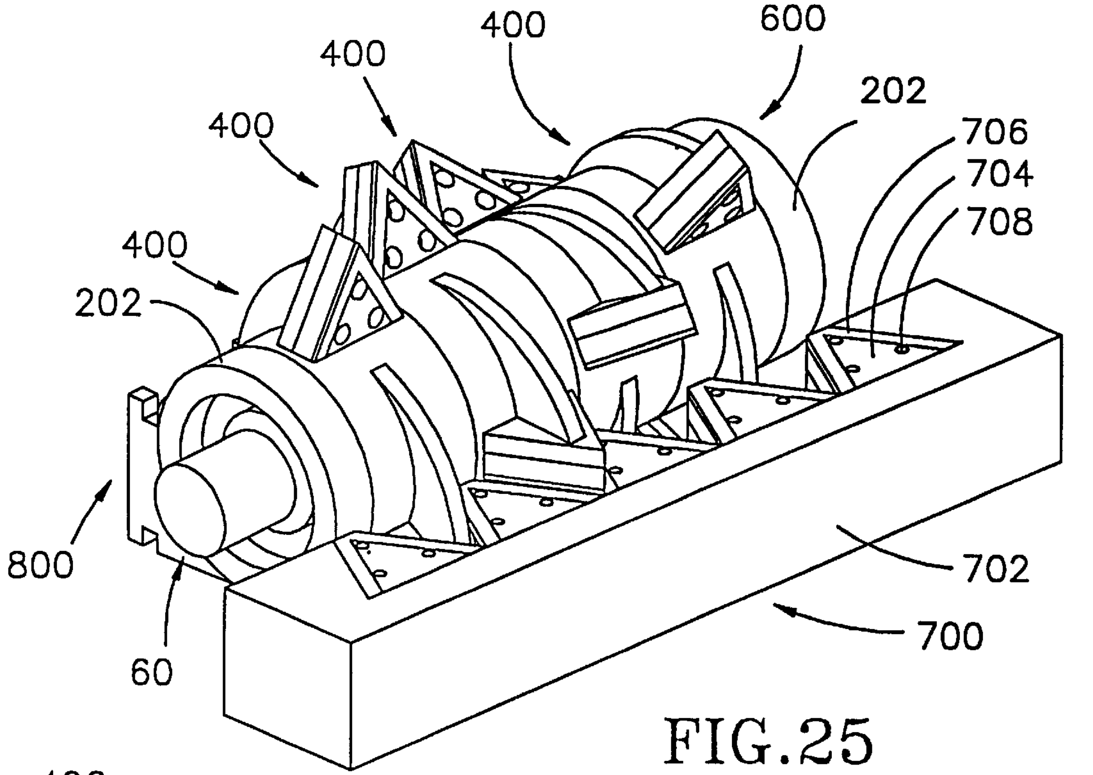
FIG. 25 is a perspective view of a coarse shredding rotor and anvil assembly which illustrates the operating principle of the coarse shredding configuration of the rotary shredder.

FIG. 25 is a rotor assembly 600 with an anvil assembly 700 shown in its operating configuration. The operating principle of the components is identical to the one described for the rotary shredder shown in FIG. 8 above. The only difference in the two is in the size of the rotor segment 400 passing through the stationary anvil assembly 700. Because of the larger size particle which may be produced by this configuration, it is known as a coarse rotary shredder. Rotor assembly 600 is formed by stacking rotor segments 400 between rotor end pieces 202 and compressing them together against a shoulder on drive shaft 60. The rotor segments 400 are stacked on the shaft so that a staggered tooth pattern is formed. This progressive tooth pattern reduces shredder power requirements by passing only one integral tooth 412 through the anvil bed plate 702 at any one moment in time. The anvil assembly 700 is formed by mounting removable anvil inserts 704 to a stationary anvil bed plate 702. The anvil inserts 704 may further be lined with removable wear inserts 706 at the shearing edges of the anvil insert 704 to extend the service life of the anvil insert 704. The anvil inserts 704 may be attached to the anvil with screws 708 located on the top or the bottom side of the anvil bed plate 702. Cleaning fingers 800 are shown located on the back side of the rotor assembly 600. These cleaning fingers 800 are similar to 1020 and are mounted to the shredder frame similar to that shown in FIG. 33, in a stationary manner and are held in close proximity to the rotor segments 400. The purpose of the cleaning fingers 800 is two fold. First, they remove material that may be wedged or otherwise adhered to individual teeth inserts 406. Secondly, they limit the rotor's 400 deflection under load. When shearing difficult material, the rotor 500 tends to deflect away from the anvil assembly 700. When the rotor 500 deflects it begins to rub against the curved pockets formed in the front face of the cleaning fingers 800. Shaft fracture may be eliminated by limiting rotor deflection in this manner. Cleaning fingers 800 may be used with both the removable tooth 20 (fine shredder) and integral tooth 412 (coarse shredder) versions of a rotary shredder 1000, 1100, 1200 and 1300.

Figures 26, 27, 28, 29, 30:
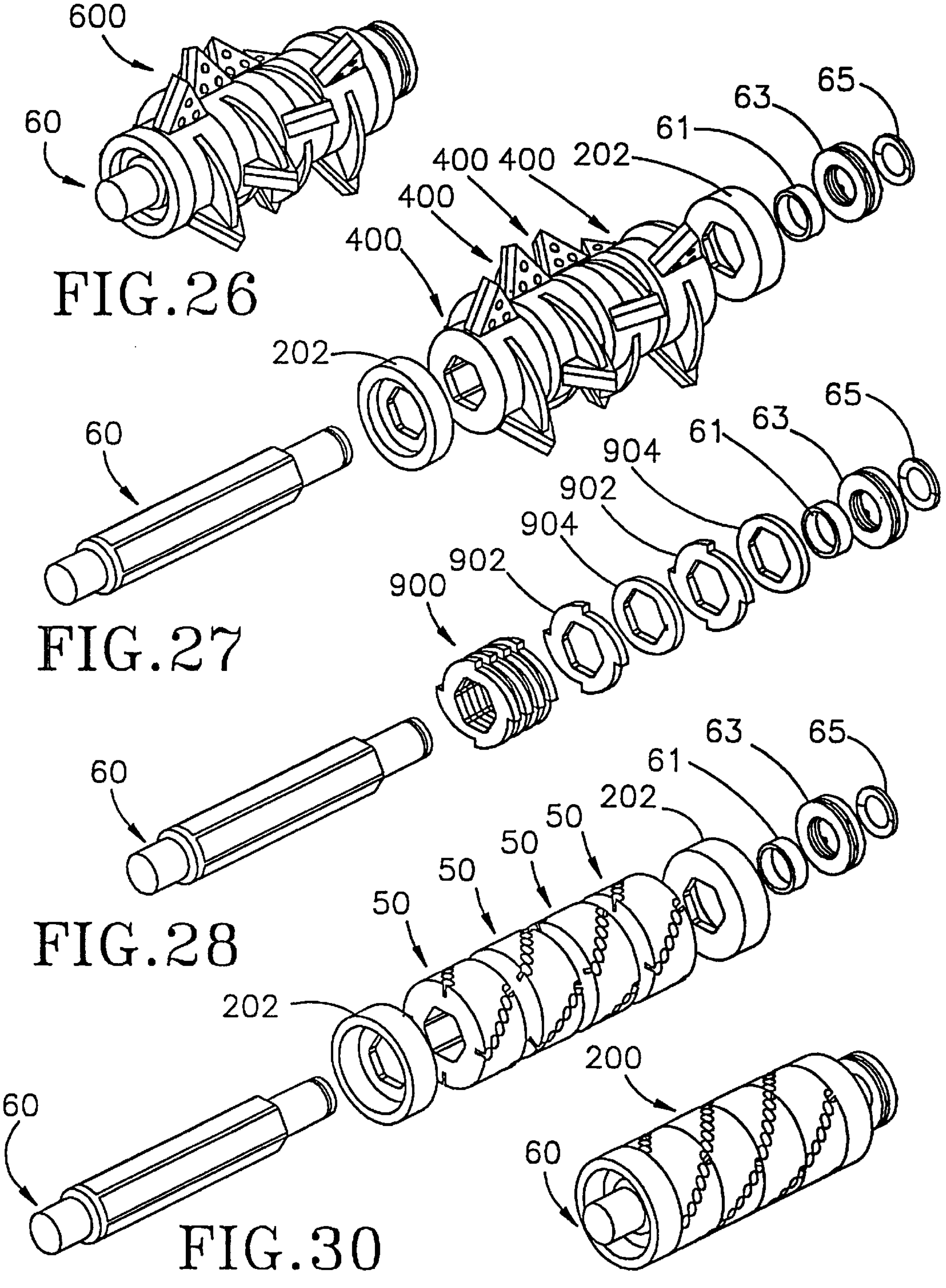
FIG. 26 is a perspective view of a coarse shredding rotor assembly.
FIG. 27 is perspective view of the exploded rotor of FIG. 26.
FIG. 28 is a perspective view which illustrates the exploded components of a shear shredder.
FIG. 29 is a perspective view of a fine shredding rotor assembly.
FIG. 30 is an exploded perspective view of the FIG. 29 rotor.

FIGS. 26 through 30 collectively illustrate the flexibility and interchangeability of the instant rotary shredder design. FIG. 26 shows an assembled rotor 600 while FIG. 27 is an exploded view of the coarse shredder rotor which utilizes components which have previously been described in FIG. 25. Likewise, FIG. 29 is an assembled fine shredder rotor assembly 200 shown without the teeth installed. FIG. 30 is an exploded view of the fine shredder rotor having components previously described in FIG. 15. Finally, FIG. 28 is an exploded view of a typical shear shredder rotor assembly 900. This type of shear shredder is typically formed by alternately stacking cutters 902 and spacers 904 on a common drive shaft. Two shear shredder rotor assemblies 900 are typically held parallel to one another so that the cutters on one assembly oppose and intermesh with cutters on the opposing shaft. Material is reduced as the two shafts rotate towards one another and the cutters grab and pull material through the intermeshing configuration. As can be seen in these figures any such single or dual shaft assembled rotors 600 having stackable cutters may be converted to any of the three configurations shown in FIGS. 26 through 30 by simply removing the rotor segments and replacing them with the desired rotor components. In this way, a single machine may be configured as a fine shredder (removable rotor teeth), coarse shredder (integral rotor teeth), or a shear shredder (intermeshing cutter disks). However, an anvil assembly will not be required when converting to a shear shredder.

FIG. 31 illustrates the top view of a single shaft rotor shredder 1000 equipped with a rotor assembly 1038 utilizing removable tooth assemblies 20 to form a fine shredder.

The rotor assembly 1038 composed of removable rotary tooth assemblies 20 mounted in rotor segments 1022 are sandwiched between two rotor end pieces 1036. The rotor assembly 1038 is held in position by shaft bearings 1066 as best seen in FIG. 45, inside housings 1008 and 1004 and it is caused to rotate towards the anvil assembly 1040 by hydraulic motor 1050. A drive utilizing an electric motor and gear box (not shown) may be used to drive the rotor in lieu of a hydraulic motor 1050 if desired. End frame members 1006 and 1002 along with side frame members 1010 and 1012 form the housing. The FIGS. 31 and 33 also show cleaning fingers 1020 mounted to the side frame member 1012 on the side opposite the anvil assembly 1040. It also shows the reject door 1026 which will open to allow the removal of an unprocessable item.

In practice, the shredder may encounter an item which it cannot shear. In this event the shredder would automatically stop and reverse direction upon exceeding a preset torque threshold delivered to the shredder rotor. Upon reversing, the reject door 1026 would open. As the rotor reversed direction, its rotary tooth assemblies 20 would lift any unshreddable item off of the anvil assembly 1040 and convey it towards the reject door 1026. The configuration of the cleaning fingers 1020 prevents the item from falling through the shredder on the back side and it provides for a down-hill path to the reject door as the item leaves contact with the rotor.

FIG. 32 shows a cross-section of the rotary shredder shown in FIG. 31 along section lines 32. FIG. 32 further shows side frames 1010 and 1012 along with rotor assembly 1038, anvil bed plate 1018, anvil insert 1016, anvil deflection bar 1028, and optional screen 1034. The cross section FIG. 32 shows an alternate means of transmitting shaft torque from drive shaft 1030 to rotor segment 1022 through shaft keys 1032 in lieu of using a hexagonal or other geometric shaft cross-section. FIG. 32 illustrates the mounting of rotary tooth assemblies 20 to the rotor segment 1022 as well as the mounting of the anvil insert 1016 to the anvil bed plate 1018 via bolts 1017. The FIG. 32 also illustrates the mounting of an optional screen 1034 to the shredder frame via bolts 1013 and 1017. Reject door 1026 is shown in its closed position and it is represented by dashed lines in its open position. The reject door may be mechanically or hydraulically operated. The anvil deflection bar 1028 is mounted to the shredder frame with bolts 1029 and its function is to force material into the path of the rotor teeth as the material begins to wedge against the side frame 1010. The optional screen 1034 is used only if it is necessary to reduce the particle size smaller than the size of the teeth passing through the anvil. When configured with screens 1034, the rotary shredder is typically described as a granulator. With the granulator configuration, cleaning fingers 1020 as seen in FIG. 33 may not be required.

FIG. 33 shows a cross-section of the rotary shredder shown in FIG. 31 along section lines 33. The section is drawn through a typical cleaning finger in the shredder to illustrate the typical cross section of cleaning finger 1020. As can be seen, the cleaning finger is sloped at its upper portion to facilitate the movement of reject material to the reject door 1026, which is located within close proximity to the rotor, having approximately 90 degrees of arc. The cleaning fingers may be mounted to the side frame 1012 with bolts 1013. In some situations, the cleaning fingers 1020 may not be bolted in place but rather left to freely float in a retaining pocket formed in the shredder side frame member 1012. Typically, the cleaning fingers are located in the spaces between teeth.

Figure 34:
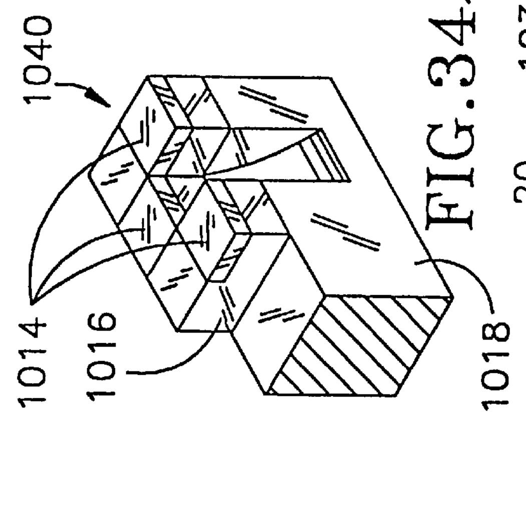
FIG. 34 is a perspective view of the anvil assembly shown in FIG. 31 TAKEN ALONG SIGHT LINE 34—34.

FIG. 34 illustrates the shredder anvil assembly 1040 shown in FIG. 31 along section lines 34. The figure further illustrates the typical construction of the anvil where a plurality of anvil inserts 1016 are mounted to the anvil bed plate 1018. Wear inserts 1014 such as tungsten carbide are embedded in the anvil insert 1016 using screws or silver solder on all sides of the tooth pocket formed in the anvil. This arrangement allows the anvil inserts to be custom fitted to the rotary tooth assembly 20, section by section, and it also provides for a simple method of replacing worn components. Use of tungsten carbide wear inserts 1014 greatly extends the operating life of the components.

Figure 35:
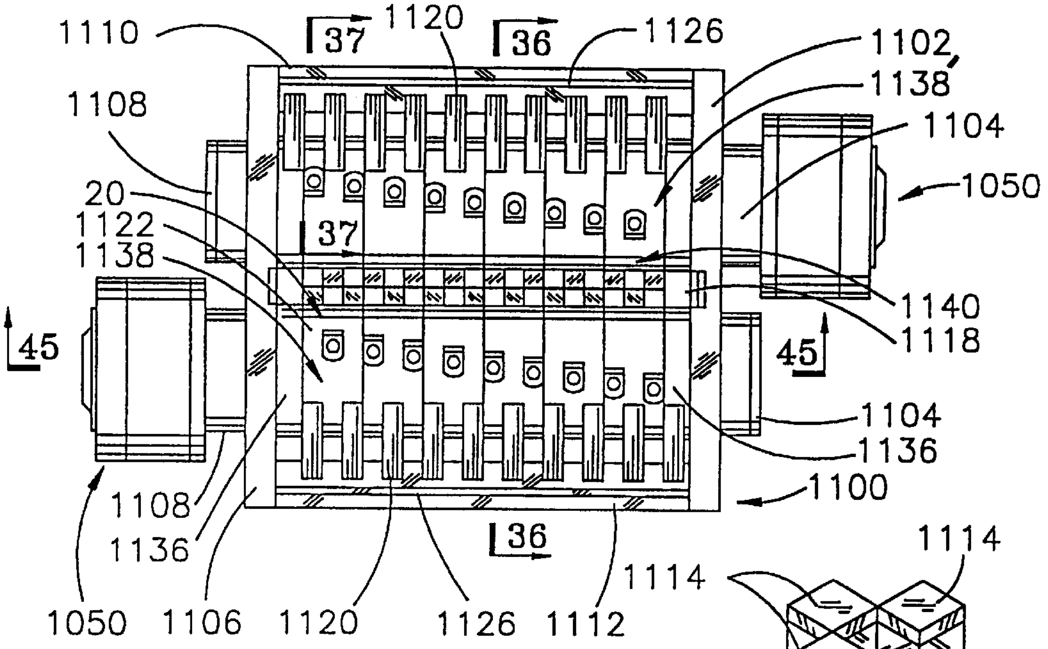
FIG. 35 is a top view of a dual rotor fine shredder.
Figure 36:
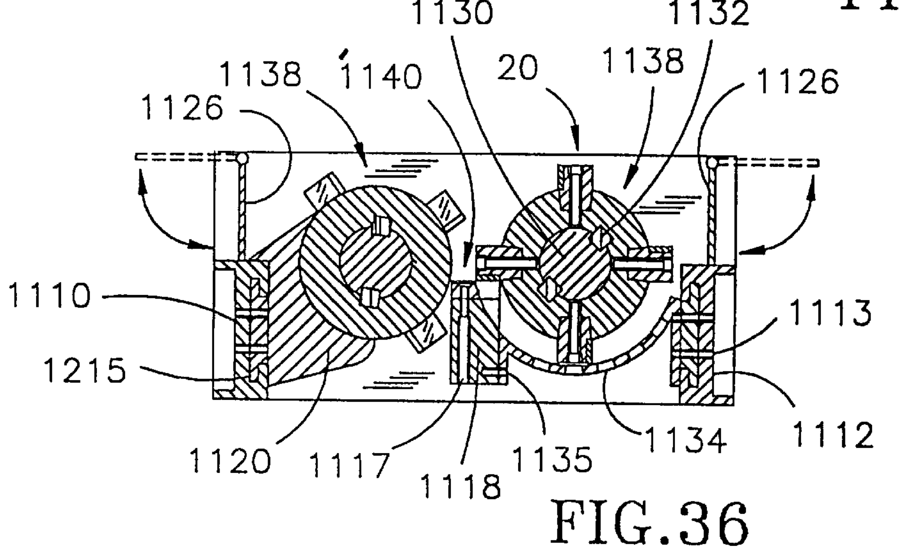
FIG. 36 is a cross section of the dual rotor fine shredder shown in FIG. 35 taken along sight lines 36—36.

FIG. 35 illustrates the top view of a dual rotor shredder equipped with removable tooth assemblies to form a fine shredder. The dual rotor assemblies 1138 and 1138' are composed of removable rotary tooth assemblies 20 mounted in rotor segments 1122 which are sandwiched between two rotor end pieces 1136. The dual rotor assemblies 1138 and 1138' is held in position by shaft bearings 1066 inside housings 1108 and 1104 and it is caused to rotate towards the anvil assembly 1140 by hydraulic motor 1050. A mechanical drive utilizing an electric motor and gear box may be used to drive the rotor in lieu of a hydraulic motor if desired. The second rotor assembly 1138' is constructed identically as the first rotor 1138. During operation, both rotors rotate towards one another and their teeth pass through a common anvil assembly 1140. Frame members 1106 and 1102 form the end housings and members 1110 and 1112 form the side frames. FIGS. 35 & 36 also show cleaning fingers 1120 mounted to the side frame members 1110 and 1112. It also shows the reject doors 1126 located above each side frame which opens to allow the removal of unprocessable items.

As discussed above in practice, the dual shredder may encounter an item which it cannot shear. In this event the shredder would automatically stop and reverse direction upon exceeding a preset torque threshold delivered to the shredder rotor. Upon reversing, the reject door 1126 would open. As the rotor reversed direction, its rotary tooth assemblies 20 would lift an unshreddable item off of the anvil assembly 1140 and covey it towards the reject door 1126. The configuration of the cleaning fingers 1120 prevents the item from falling through the shredder on the back side and the cleaning fingers 1120 provide for a down-hill path to the reject door as the item leaves contact with the rotor. For hydraulic drives, each rotor may operate and reject material independently. For direct mechanical drives, both shafts may be driven through a common gear box so that both rotors reject material if either one of them encounters an unshreddable item.

FIG. 36 shows a cross-section of the rotary shredder shown in FIG. 35 along section lines 36. FIG. 36 also shows side frame members 1110 and 1112 along with the dual rotor assemblies 1138 and 1138', anvil bed plate 1118, anvil insert 1116 seen in FIG. 37, and optional screen 1134. As discussed earlier this cross section shows an alternate means of transmitting shaft torque from drive shaft 1130 to rotor segment 1122 through shaft keys 1132 in lieu of using a hexagonal or other geometric shaft cross-section. The FIG. 36 further illustrates the mounting of rotary tooth assemblies 20 to the rotor segment 1122 as well as the mounting of the anvil insert 1116 to the anvil bed plate 1118 through the use of bolts 1117. The FIG. 36 also illustrates the mounting of an optional screen 1134 to the shredder frame with bolts 1113 and 1135. Reject doors 1126 are shown in their closed position and they are represented by dashed lines in their open position. The reject doors 1126 may be mechanically or hydraulically operated. The optional screen 1034 is used only if it is necessary to reduce the particle size smaller than the size of the rotary tooth assemblies 20 passing through the anvil assembly 1140. When configured with screens, the rotary shredder is typically described as a granulator. Cleaning fingers 1120 may not be required for the granulator configuration since the size particle it accepts is much smaller.

The cross section FIG. 36 is drawn through a typical cleaning finger in the shredder to illustrate the typical cross section of cleaning finger 1120. As can be seen, the cleaning finger is sloped on the top to facilitate the movement of reject material to the reject door 1126. It is located within close proximity to the rotor with a minimum of 60 degrees of arc length to provide control over the rotor deflection. The cleaning fingers may be mounted to the side frame 1112 with bolts 1113. In some situations, the cleaning fingers 1120 may not be bolted in place but rather left to freely float in the retaining pocket formed in the shredder side frame member 1112.

Figure 37:
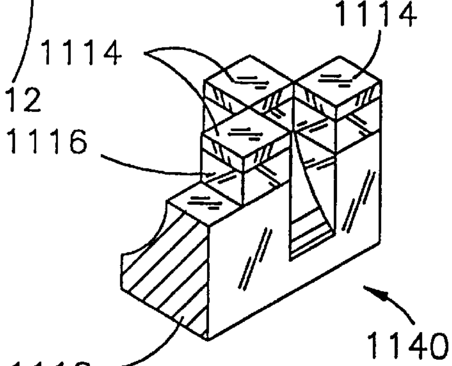
FIG. 37 is a perspective view of the anvil assembly of the dual rotor fine shredder shown in FIG. 35 taken along sight line 37—37.

FIG. 37 a rotary shredder anvil assembly 1140 shown in FIG. 35 along section lines 37. The figure illustrates the typical construction of the anvil assembly 1140 where a series of anvil inserts 1116 are mounted to the anvil bed plate 1118. Wear inserts 1114 such as tungsten carbide are embedded in the anvil insert 1116 using screws or silver solder on all sides of the tooth pocket formed in the anvil. This arrangement allows the anvil inserts to be custom fitted to the rotor teeth, section by section, and it also provides for a simple method of replacing worn components. Use of tungsten carbide wear inserts 1114 greatly extends the operating life of the components. The figure also illustrates the operating principle of the dual rotor assemblies 1138 and 1138' passing through a single anvil assembly 1140. With this configuration, the dual rotor machine continuously clears the space between the rotors as the rotor teeth pull material towards the anvil. Notice that the teeth on the first rotor assembly 1138 is aligned to intermesh with the teeth on the second rotor assembly 1138'. In this way, material may be reduced by tooth-to-tooth action between the rotor assemblies 1138 and 1138' as well as tooth-to-anvil action. This configuration also tends to be self feeding since both rotors rotate towards one another thereby compressing and pulling additional material towards the anvil. This arrangement allows existing dual rotor shredders to be reconfigured with a center anvil.

Figure 38:
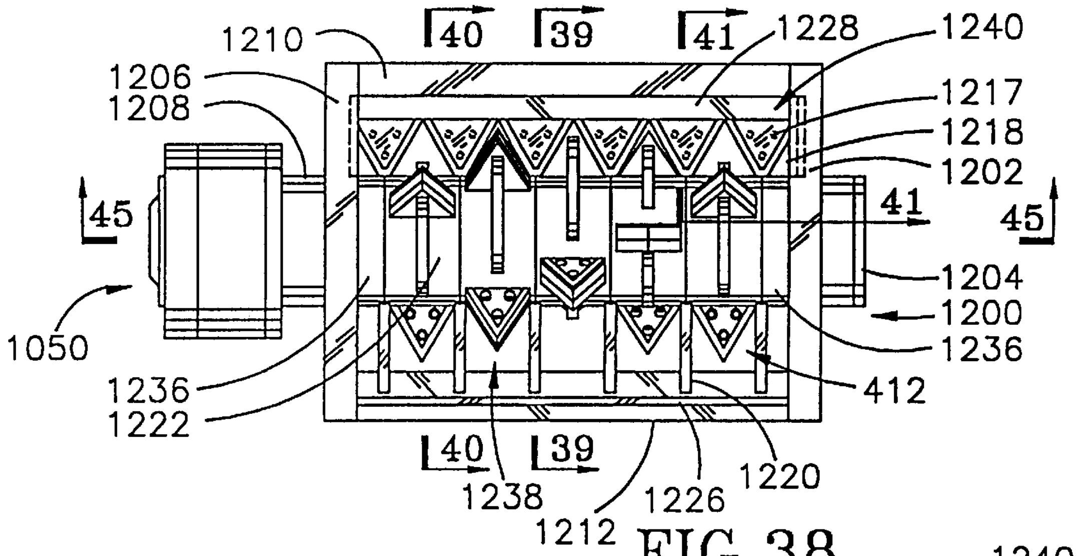
FIG. 38 is a top view of a single rotor coarse shredder.

FIG. 38 illustrates the top view of a single rotor shredder equipped with integral teeth to form a coarse shredder. The rotor assembly 1238 is composed of integral teeth 412 mounted to rotor segments 1222 which are sandwiched between two rotor end pieces 1236. The rotor assembly 1238 is held in position by bearings 1066 inside housings 1208 and 1204 and it is caused to rotate towards the anvil assembly 1240 by hydraulic motor 1050. A mechanical drive utilizing an electric motor and gear box may be used to drive the rotor in lieu of a hydraulic motor if desired. Frame members 1206 and 1202 form the end housing members and members 1210 and 1212 form the sides. The figure also shows cleaning fingers 1220 mounted to the side frame 1212 on the side opposite the anvil assembly 1240. It also shows the reject door 1226 which will open to allow the removal of an unprocessable item.

In practice, the shredder may encounter an item which it cannot shear. In this event the shredder would automatically stop and reverse direction upon exceeding a preset torque threshold delivered to the shredder rotor. Upon reversing, the reject door 1226 would open. As the rotor reversed direction, its integral teeth 412 would lift an unshreddable item off of the anvil assembly 1240 and convey it towards the reject door 1226. The configuration of the cleaning fingers 1220 prevents the item from falling through the shredder on the back side and it provides for a down-hill path to the reject door as the item leaves contact with the rotor.

Figure 39:
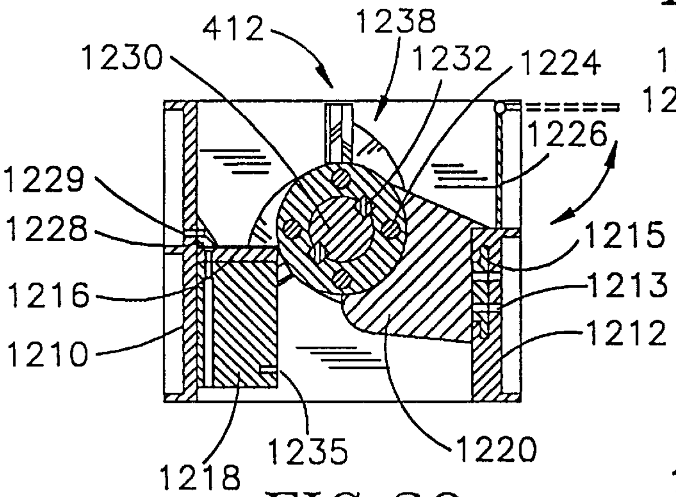
FIG. 39 is a cross-sectional view of the single rotor coarse shredder shown in FIG. 38 taken along sight line 40—40.
Figure 40:
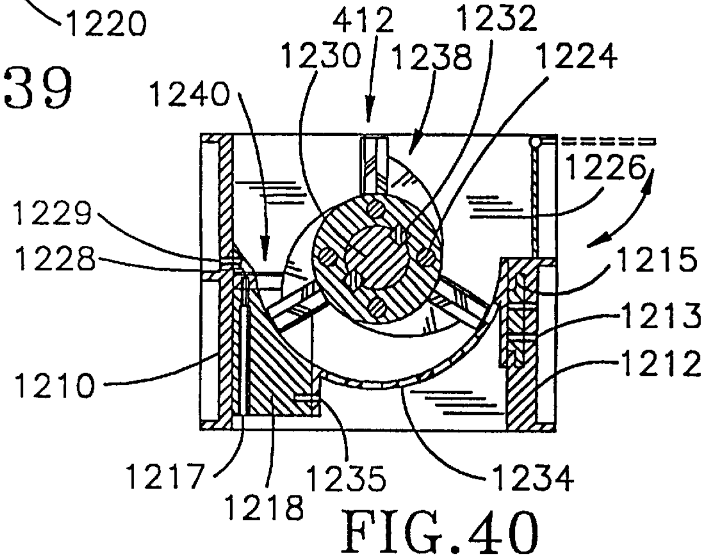
FIG. 40 is a cross-sectional view of the single rotor coarse shredder shown in FIG. 38 taken along sight line 39—39.

FIG. 40 shows a cross-section of the rotary shredder shown in FIG. 38 along section lines 40. FIG. 40 shows side frame members 1210 and 1212 along with rotor assembly 1238, anvil bed plate 1218, anvil insert 1216 as seen in FIG. 39, anvil deflection bar 1228, and optional screen 1234. The cross section shows an alternate means of transmitting shaft torque from drive shaft 1230 to rotor segment 1222 through shaft keys 1232 in lieu of using a hexagonal or other geometric shaft cross-section. FIG. 40 also shows compression rods 1224 which provide an alternate means of compressing the rotor segments 1222 and rotor end pieces 1236 as seen in FIG. 38 together. FIG. 38 illustrates the mounting of integral teeth 412 to the rotor segment 1222 as well as the mounting of the anvil insert 1216 to the anvil bed plate 1218 through the use of bolts 1217. FIG. 40 also illustrates the mounting of an optional screen 1234 to the shredder frame via bolts 1213 and to anvil bed plate 1218 via bolts 1235. Reject door 1226 is shown in its closed position and it is represented by dashed lines in its open position. The reject door 1226 may be mechanically or hydraulically operated. The anvil deflection bar 1228 is mounted to the shredder frame via bolts 1229 and its function is to force material into the path of the rotor teeth as the material begins to wedge against the side frame member 1210. The optional screen 1234 is used only if it is necessary to reduce the particle size smaller than the size of the teeth passing through the anvil. When configured with screens 1234, the rotary shredder 1200 is typically described as a granulator.

FIG. 39 shows a cross-section of the rotary shredder shown in FIG. 38 along section lines 39. The section is drawn through a typical cleaning finger 1220 in the shredder to illustrate the typical cross section of a cleaning finger 1220. As can be seen, the cleaning finger 1220 is sloped on top to facilitate the movement of reject material to the reject door 1226. These fingers 1220 are located within close proximity to the rotor for a minimum of 60 degrees of arc length to provide control over the rotor deflection. The cleaning fingers may be mounted to the side frame 1212 via bolts 1213. In some situations, the cleaning fingers 1220 may not be bolted in place but rather left to freely float in the retaining pocket 1215 formed in the shredder side frame member 1212.

Figure 41:
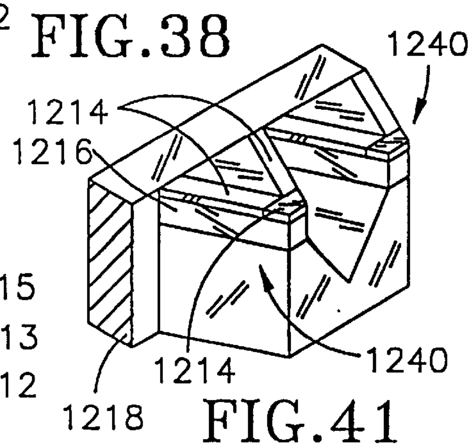
FIG. 41 is perspective view of the anvil assembly used in the single rotor coarse shredder is shown in FIG. 38 taken along sight line 41—41.

FIG. 41 is the shredder anvil assembly 1240 shown in FIG. 38 along section lines 41. The figure illustrates the typical construction of the anvil 1220 where a series of anvil inserts 1216 are mounted to the anvil bed plate 1218. Wear inserts 1214 such as tungsten carbide are embedded in the anvil insert 1216 on the sides of the anvil insert exposed to the rotor teeth 412 shown in FIG. 40. This arrangement allows the anvil inserts 1216 to be custom fitted to the rotor teeth 412, section by section, and it also provides for a simple method of replacing worn components. Use of tungsten carbide wear inserts 1214 greatly extends the operating life of the components.

Figure 42:
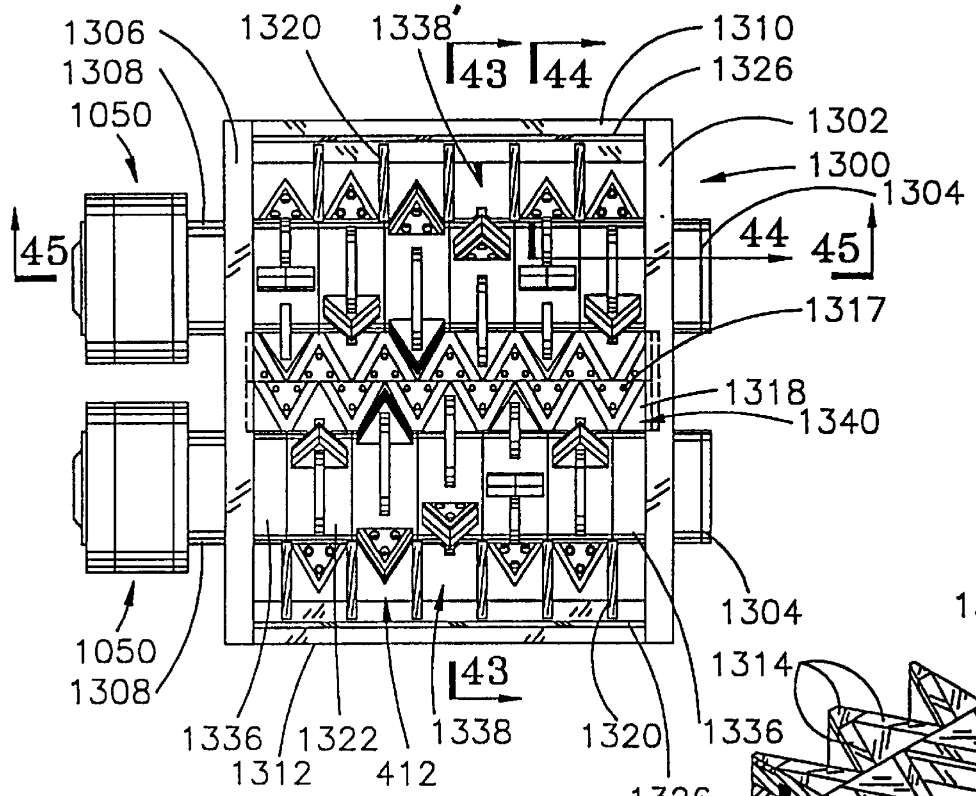
FIG. 42 is a top view of a dual rotor coarse shredder.
Figure 65:
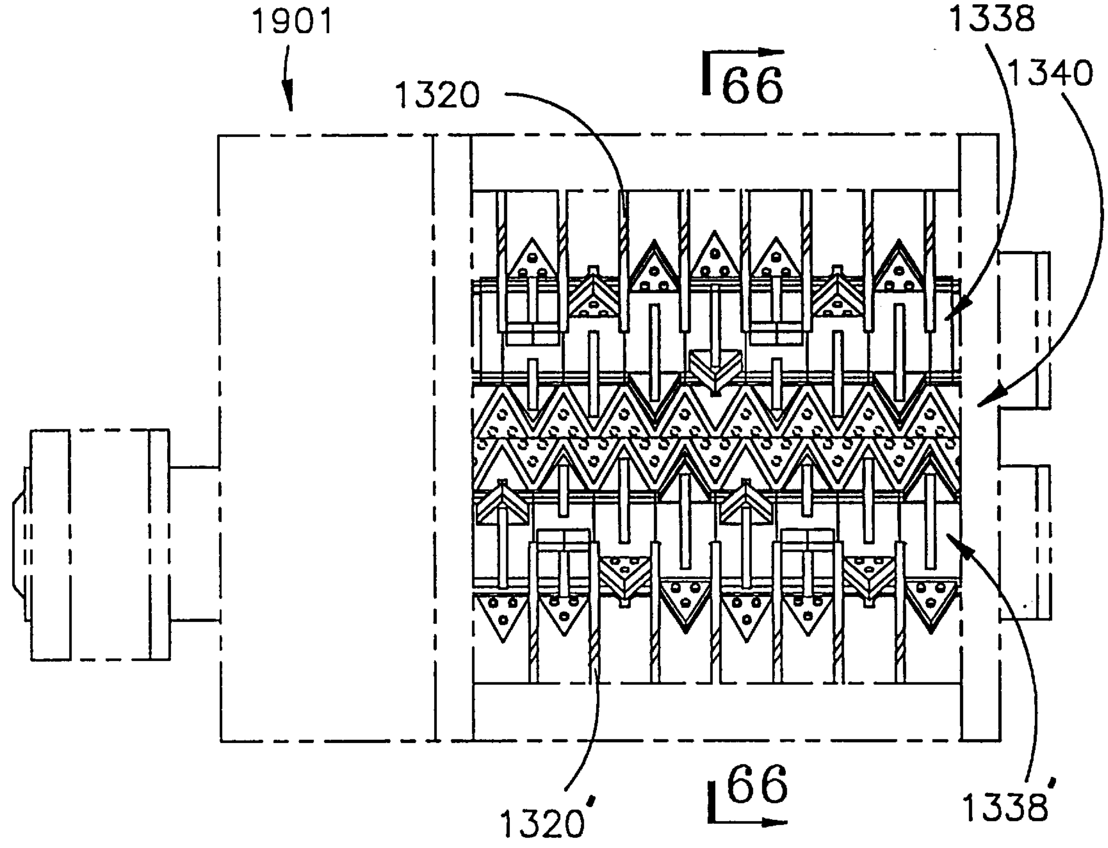
FIG. 65 is a top view of a typical shear shredder converted to a coarse rotary shredder.

FIG. 42 illustrates the top view of a dual rotor coarse shredder 1300 equipped with rotor segments 1338,1338' having integral teeth to form a coarse shredder. The rotor assembly 1338, 1338' is composed of rotor supports 1322 having removable integral triangular teeth 412 mounted in rotor segments 1322 which are sandwiched between two rotor end pieces 1336. The rotors 1338, 1338' are held in position by bearings 1066, 1076 shown in FIG. 45 inside housings 1308 and 1304 and it is caused to rotate towards the anvil assembly 1340 by hydraulic motor 1050. A mechanical drive utilizing an electric motor and gear box, as illustrated in FIG. 65, may be used to drive the rotor in lieu of a hydraulic motor if desired. The second rotor assembly 1338' is constructed identically as the first rotor 1338. During operation, both rotors rotate towards one another and their teeth 412 pass through a common anvil assembly 1340. Frame members 1106 as seen in FIG. 35 and 1202 as seen in FIG. 38 illustrated in this FIG. 42 as items 1302 and 1306, form the end housings and members 1110 and 1112 as seen in FIG. 35 and illustrated in FIG. 42 as items 1310 and 1312 form the side frames. The figure also shows cleaning fingers 1320 mounted to the side frame members 1310 and 1312. It also shows the reject doors 1326 located above each side frame which will open to allow the removal of an unprocessable items.

Figure 63:
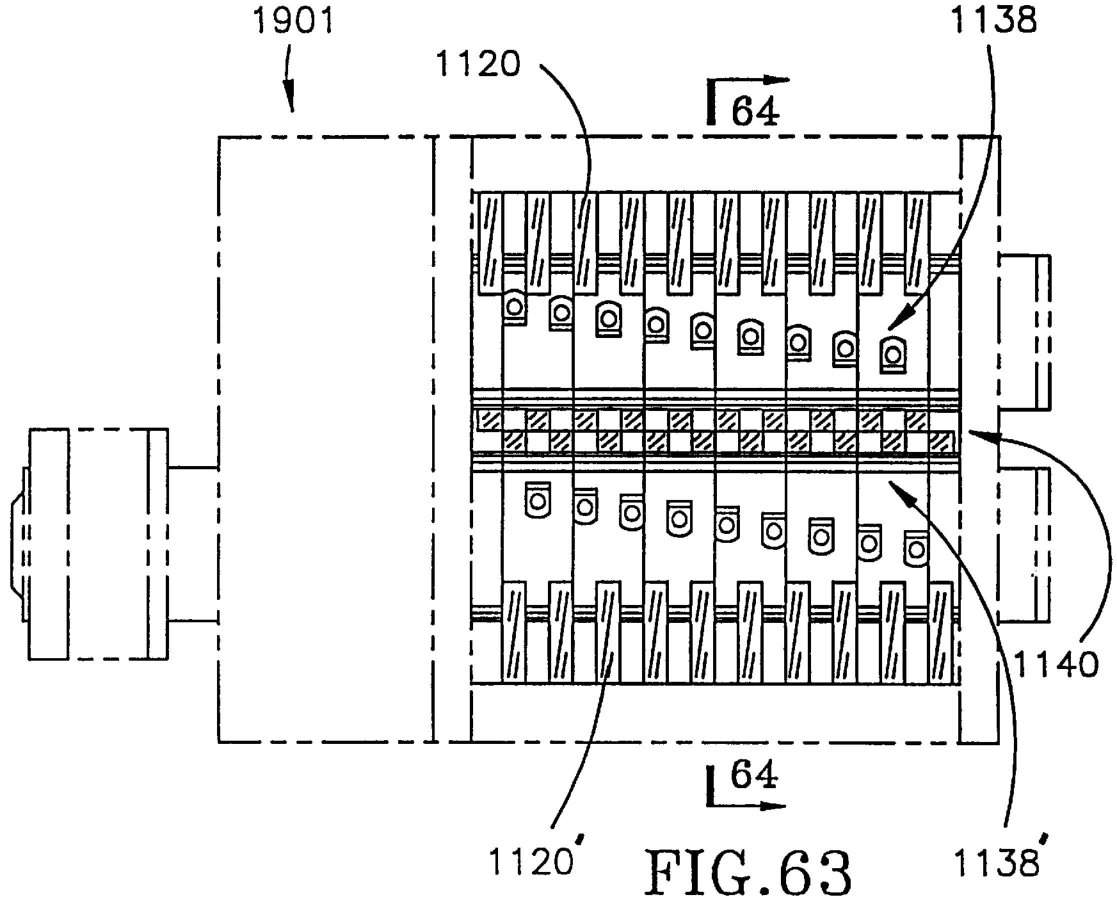
FIG. 63 is a top view of a typical shear shredder converted to a fine rotary shredder using rotor segments.

In practice, the shredder 1300 may encounter an item which it cannot shear. In this event the shredder would automatically stop and reverse direction upon exceeding a preset torque threshold delivered to the shredder rotor. Upon reversing, the reject door 1326 would open. As the rotor reversed direction, its integral teeth 412 would lift an unshreddable item off of the anvil 1340 and covey it towards the reject door 1326. The configuration of the cleaning fingers 1320 prevents the item from falling through the shredder between the rotor assembly 1338, 1338' and the side walls 1310, 1312 and it provides for a down-hill path to the reject door as the item leaves contact with the rotor 1338,1338'. With hydraulic drives, each rotor 1050 may operate and reject material independently. With direct mechanical drives, both shafts are driven through a common gear box 1901 as seen in FIG. 63 so that both rotors reject material if either rotor 1338,1338' encounters an unshreddable item.

Figure 44:
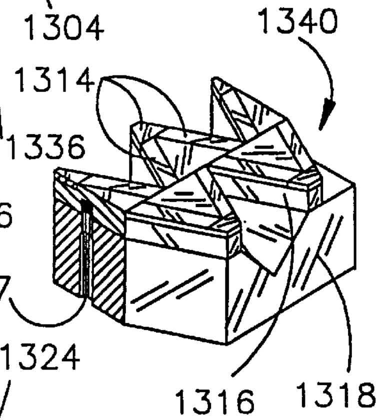
FIG. 44 is a perspective view of the anvil assembly of the dual rotor coarse shredder shown in FIG. 42.
Figure 43:
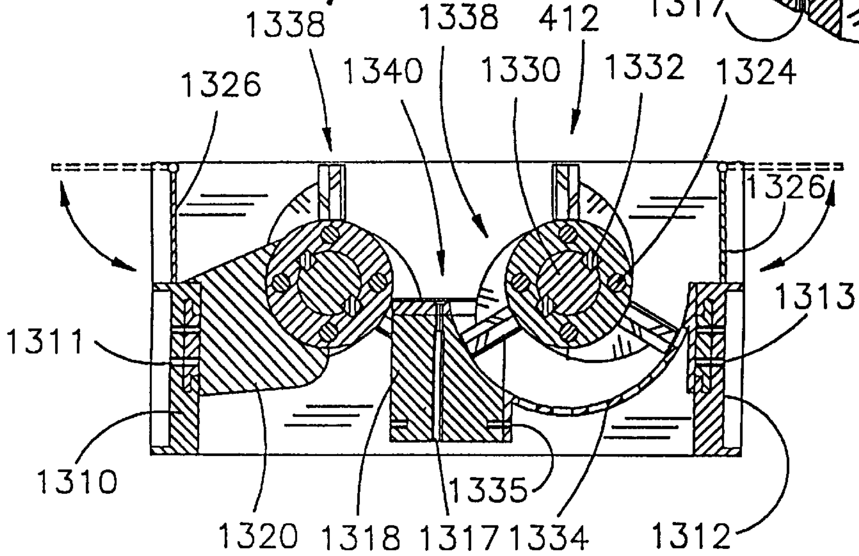
FIG. 43 is a cross-section of the shredder shown in FIG. 42 taken along sight line 43—43.

FIG. 43 shows a cross-section of the rotary shredder shown in FIG. 35 along section lines 43. FIG. 43 shows side frame members 1310 and 1312 along with rotor assemblies 1338 and 1338', anvil bed plate 1318, anvil insert 1316 as seen in FIG. 44, and optional screen 1334. The cross section shows an alternate means of transmitting shaft torque from drive shaft 1330 to rotor segment 1322 as seen in FIG. 42 through shaft keys 1332 in lieu of using a hexagonal or other geometric shaft cross-section as shown in FIG. 27–30. FIG. 43 illustrates the mounting of integral teeth 412 to the rotor segment 1322 as seen in FIG. 42 as well as the mounting of the anvil insert 1316 as seen in FIG. 42 to the anvil bed plate 1318 via bolts 1317. FIG. 43 also illustrates the mounting of an optional screen 1334 to the shredder frame via bolts 1313 and 1335. The reject doors 1326 are shown in their closed position and they are represented by dashed lines in their open position. The reject doors 1326 may also be mechanically or hydraulically operated. The optional screen 1334 is used only if it is necessary to reduce particle size smaller than that produced by the teeth 412 passing through the anvil 1340. When configured with screens 1334, the rotary shredder is typically described as a granulator.

The FIG. 43 section view is drawn through a typical cleaning finger 1320 in the shredder to illustrate the typical cross section of cleaning finger 1320. The cleaning finger is sloped on the top to facilitate the movement of reject material to the reject door 1326 and is located within close proximity to the rotor for a minimum of 60 degrees of arc length to provide control over the rotor's deflection. The cleaning fingers may be mounted to the side frames 1310, 1312 via bolts 1311. In some situations, the cleaning fingers 1320 may not be bolted in place but rather left to freely float in the retaining pocket 1315 formed in the shredder side frame member 1312.

FIG. 44 is a perspective view of the rotary shredder anvil assembly 1340 shown in FIG. 42. FIG. 44 illustrates the typical construction of the anvil assembly 1340 where a series of anvil inserts 1316 are mounted to the anvil bed plate 1318 via bolts 1317. Wear inserts 1314 such as tungsten carbide are embedded in the anvil insert 1316 using screws 708 as illustrated in FIG. 25 or silver solder on the sides of the anvil insert exposed to the integral teeth 412 as seen is FIG. 42. This arrangement allows the anvil inserts 1315 to be custom fitted to mesh with the rotor teeth, section by section, and it also provides for a simple method of replacing worn components. Use of tungsten carbide wear inserts 1314 greatly extends the operating life of the components. The figure also illustrates the operating principle of the dual rotors 1338 and 1338' passing through a single anvil assembly 1340. With this configuration, the dual rotor shredder 1300 continuously clears the space between the rotors 1338,1338' as the rotor teeth 412 pull material towards the anvil assembly 1340. It should be noted that the teeth 412 on the first rotor 1338 are aligned to intermesh with the teeth 412 on the second rotor 1338'. In this way, material may be reduced by tooth-to-tooth action between the rotors 1338 and 1338' as well as tooth-to-anvil action.

The FIG. 42 configuration also tends to be self feeding since both rotors 1338,1338' rotate towards one another thereby compressing and pulling additional material towards the anvil assembly 1340.

FIG. 45 is a cross-section drawing of a rotary shredder including the above discussed rotor assemblies and further illustrates the typical construction of the drive components. It is drawn along section line 45 of FIG. 31 but is typically representative of any rotary shredder discussed herein. Hydraulic motor 1050 drives the rotor drive shaft 1030 to deliver torque to the rotor segments 1022. A mechanical drive utilizing a gear box 1901 as seen in FIG. 65 may be used in lieu of the hydraulic motor 1050 as also seen in FIG. 65. Rotor segments 1022 and rotor end pieces 1036 are stacked on the hexagonal shaft shown against a shoulder on the drive shaft 1030. On the end of the shaft 1030, opposite the driven end, is located a shaft sleeve 1064, shaft bearing 1066, clamping assembly 1068 and clamping ring 1070. One can see that the clamping ring 1070 provides a means for the clamping assembly 1068 to exert a clamping force against all components stacked on the rotor shaft 1030. As the bolts in the clamping assembly 1068 are tightened, the clamping assembly expands thereby providing the required clamping force to hold all rotor components together. It is also possible to accomplish the same thing by first threading the end of the shaft opposite the drive, and then screwing a large nut on the shaft to provide the clamping force required. Experience has found that the clamping assembly 1068 is able to exert much more clamping force than a single large nut and it is therefore preferred.

FIG. 45 shows that the hydraulic drive motor is mounted to end frame 1006 via bolts 1051. The drive end frame 1006 is shown to house thrust bearing 1076. The thrust bearing 1076 is clamped in its pocket using bearing retaining gland 1082 and bolts inserted in mounting holes 1083. The thrust bearing 1076 itself is mounted to the rotor drive shaft 1030 through the use of bearing nut 1080 which clamps the thrust bearing 1076 against a shoulder on the drive shaft 1030. Lock washer 1078 prevents the bearing nut 1080 from loosening. Lip seal 1074 presses into the drive end frame 1006 and it seals against rotor drive shaft 1030 to prevent the thrust bearing 1076. The thrust bearing 1076 is grease lubricated through grease fitting 1052. The thrust bearing 1076 would be oil lubricated in the event that the rotor drive shaft 1030 is driven through an integral gear box assembly in lieu of the hydraulic drive motor 1050. The shredder end frame 1006 may also be circularly grooved 1071 to intermesh with a circular projection on the rotor end piece 1036 so that foreign material can be prevented from entering the lip seal 1074 area. In addition this circular groove 1071 provides a pocket for the expansion of the rotor segments estimated to between 0.05 and 0.20 thousandths of an inch per linear foot of rotary length. This allows the bearing 1066 to expand linearly in the bearing pocket formed in the end housing 1002. Such expansion is compensated for by the anvil assembly detailed in FIG. 69. Therefore, both rotor assembly and its segments and the anvil assembly and its segments to expand linearly at the same rate beginning at the their common attachment at the head member 1006. Thereby maintaining a close tolerance relationship between rotor teeth and their corresponding anvil inserts.

The rotor drive shaft 1030 is supported on the end opposite the drive by end housing 1002 and bearing 1066. As described earlier, the bearing 1066 is mounted to the rotor shaft 1030 by the clamping assembly 1068. The end frame housing or foot frame member 1002 is bored so that the bearing 1066 can move axially in its pocket. Axial movement of the bearing 1066 is expected to occur as the temperature of the rotor assembly increases during operation. This arrangement also allows the frame end 1002 to be removed from the shredder 1000 without the need to remove the drive shaft 1030. This means that the rotor segments 1022 can be easily changed by removing the end frame 1002 without the need to remove the entire rotor drive shaft 1030 from the shredder 1000. Bearing cover 1072 is attached to the end housing via bolts 1073 and it protects the shaft and bearing from foreign matter. Shaft seal 1060 is pressed into end frame 1002 and it engages the shaft sleeve 1064 to protect the bearing 1066. The bearing 1066 is typically grease lubricated through grease fitting 1062, but it may also be oil lubricated.

Figure 46:
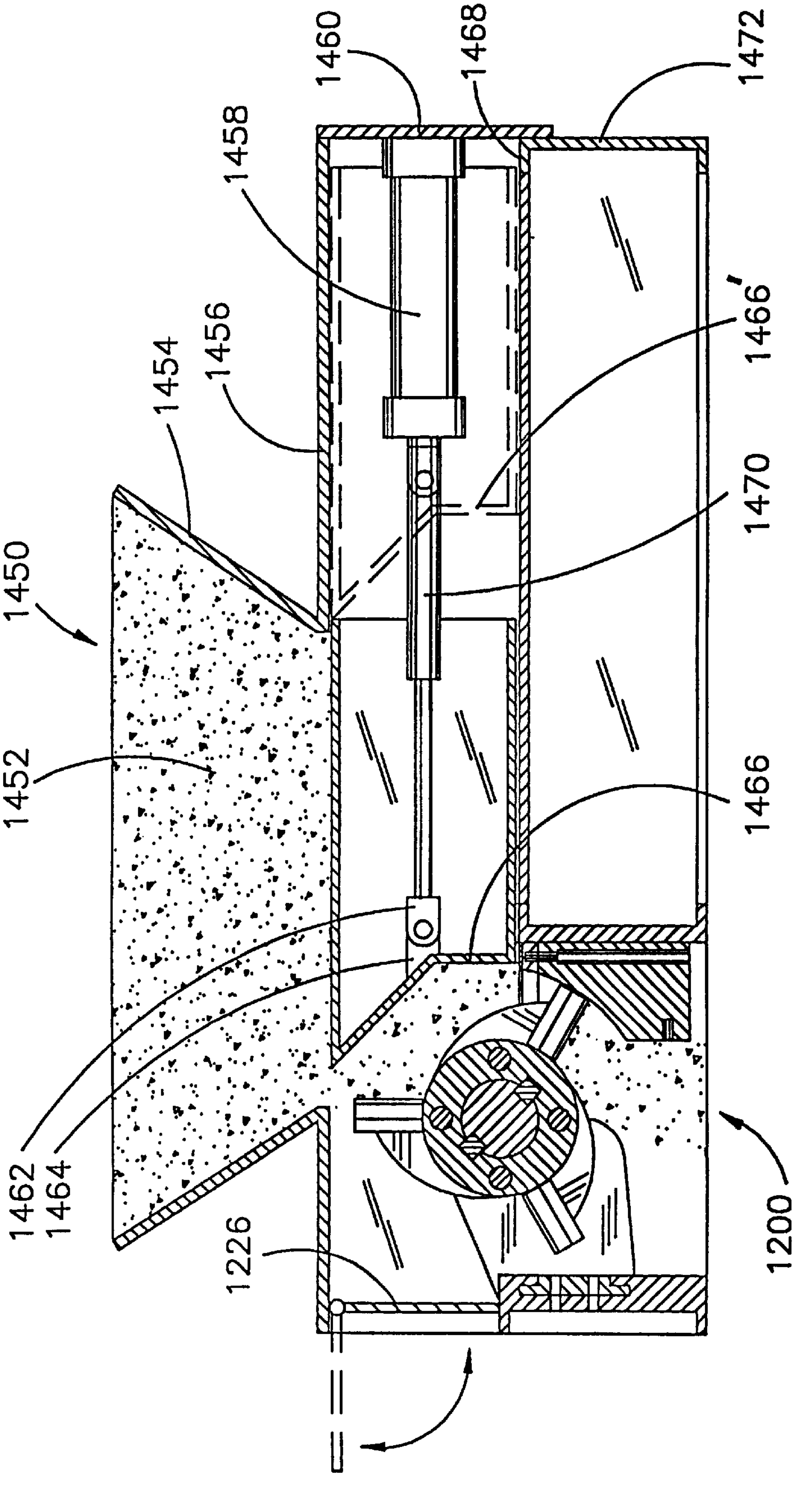
FIG. 46 is as cross-sectional view of a horizontal hydraulic ram feed mechanism fitted to a rotary shredder.

FIG. 46 is a cross-sectional drawing of a horizontal ram feeding system 1450 that may be used with single shaft rotary shredders 1200. The ram feeding system 1450 is used in cases where the material to be shredded will not self feed through the shredder. It is composed of feed hopper 1454 which is positioned above feed ram 1466. The feed ram 1466 is caused to move horizontally by hydraulic cylinder 1458 which is connected to the ram 1466 through cylinder rod 1470, clevis 1462 and ram pivot bracket 1464. The hydraulic cylinder 1458 is held stationary on the end opposite the ram through the use of mounting plate 1460 or some similar mounting means. The feed ram 1466 may be supported and guided through the use of linear tracks and cam followers not shown. The front face of the feed ram (feeding the shredder) may be angled or curved to match the path of the rotor teeth 412.

In practice, the feed ram 1466 begins its cycle by retracting to the position shown in FIG. 46 by the dashed lines 1467. When in this position, material 1452 in the feed hopper 1454 will freely fall into a ram chamber formed by chamber bottom 1468, chamber top 1456, and the two side walls not shown. The ram 1466 then proceeds forward at a controlled and steady rate thereby pushing the material 1452 into the shredder 1200. Shredder torque is continuously monitored, and ram feed rate is modulated accordingly to prevent undue overload and reversing of the shredder. The ram 1466 proceeds forward until it reaches the end of its stroke which places the front face of the ram in close proximity to the rotor teeth 412 in the shredder 1200. The ram 1458 then fully retracts and begins the cycle again. Unprocessable material may be encountered during the ram feed cycle. When this occurs, the shredder 1200 will reverse direction and the feed ram will stop. Reject door 1226 will open and the unprocessable item will be rejected from the shredder 1200. After some preset period of time or number of revolutions the reject door 1226 will close and the shredder rotor and the feed ram 1466 will both proceed forward.

Figure 47:
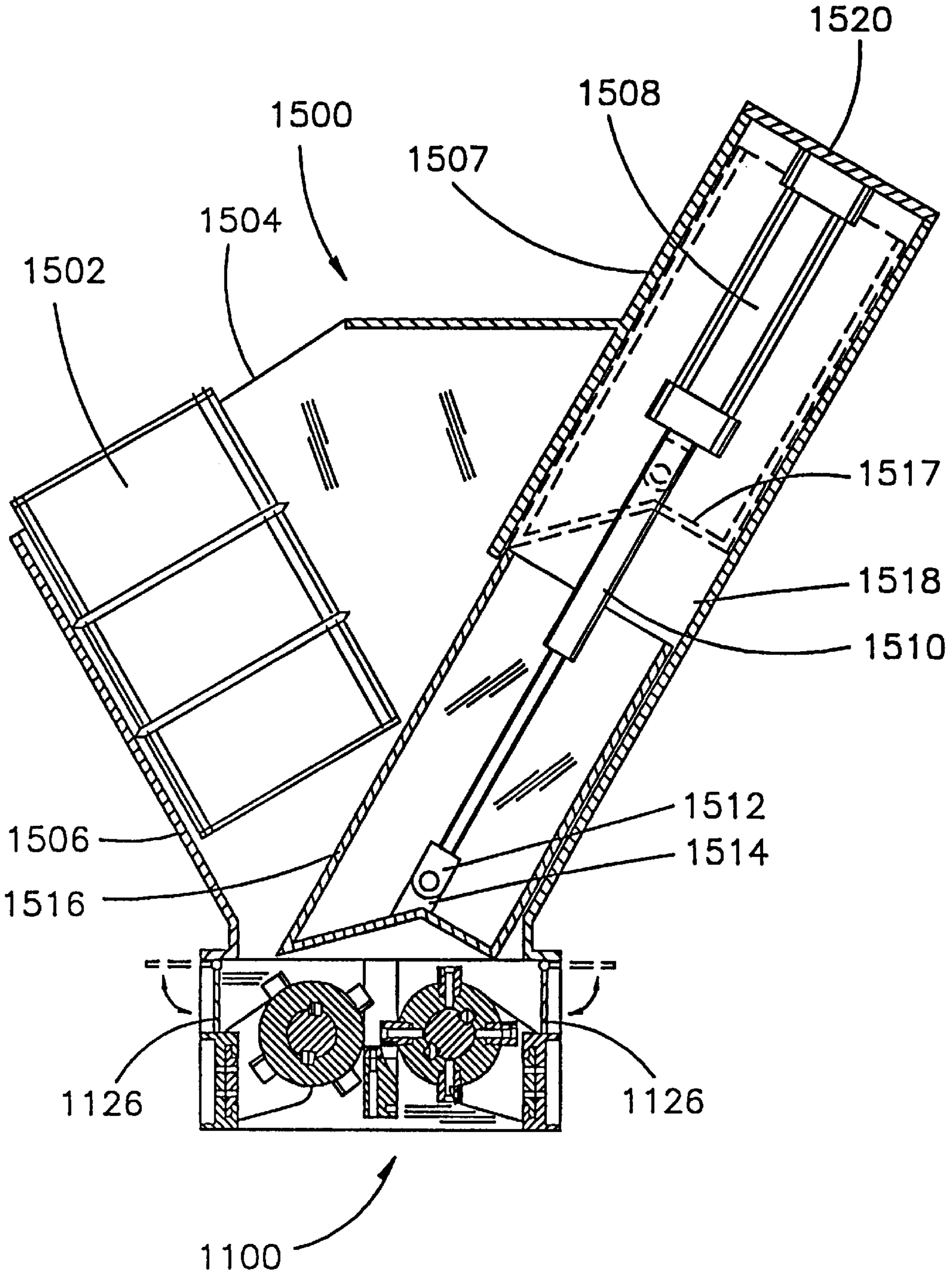
FIG. 47 is a cross-sectional drawing of an inclined hydraulic ram feed system fitted to a rotary shredder.

FIG. 47 is a cross-sectional drawing of an inclined ram feeding system 1500 that may be used with both single shaft and dual shaft rotary shredders 1000,1100. The ram feeding system 1500 is used in cases where the material to be shredded will not self feed through the duel shaft shredder 1100. It is composed of a feed hopper 1504 which is positioned adjacent to feed ram 1516. The feed ram 1516 mounted in an inclined position with respect to the duel shaft rotary shredder 1100 and it is caused to move diagonally by hydraulic cylinder 1508 which is connected to the feed ram 1516 via cylinder rod 1510, clevis 1512 and ram pivot bracket 1514. The hydraulic cylinder 1508 is held stationary on the end opposite the ram through the use of mounting plate 1520 or some similar mounting means. The feed ram 1516 may be supported and guided through the use of linear tracks and cam followers not shown. The front face of the ram (feeding the shredder) may be angled or curved to match the path of the rotor teeth.

In practice, the feed ram 1516 begins its cycle by retracting to the position shown on the figure by the dashed lines 1517. When in this position, material including container 1502 in the feed hopper 1506 will freely fall into the ram chamber formed by chamber bottom 1518, cylinder chamber top 1507, and the two side walls not shown. Afterwards, the ram will proceed forward at a controlled and steady rate thereby pushing the material into the duel shaft shredder 1100. The shredder torque is continuously monitored, and the ram feed rate is modulated accordingly to prevent undue overload and reversing of the shredder. The ram proceeds forward until it reaches the end of its stroke which places the front face of the ram in close proximity to the rotor teeth in the duel shaft shredder 1100. Afterwards, the ram will fully retract and begin the cycle again. Unprocessable material may be encountered during the ram feed cycle. When the occurs, the shredder will reverse direction and the feed ram will stop. The appropriate reject door 1126 will open and the unprocessable item will be rejected from the duel shaft shredder 1100. After some preset time period or fixed number of revolutions, the reject door will close and the shredder rotor and the feed ram 1516 will both proceed forward.

Figure 48A:
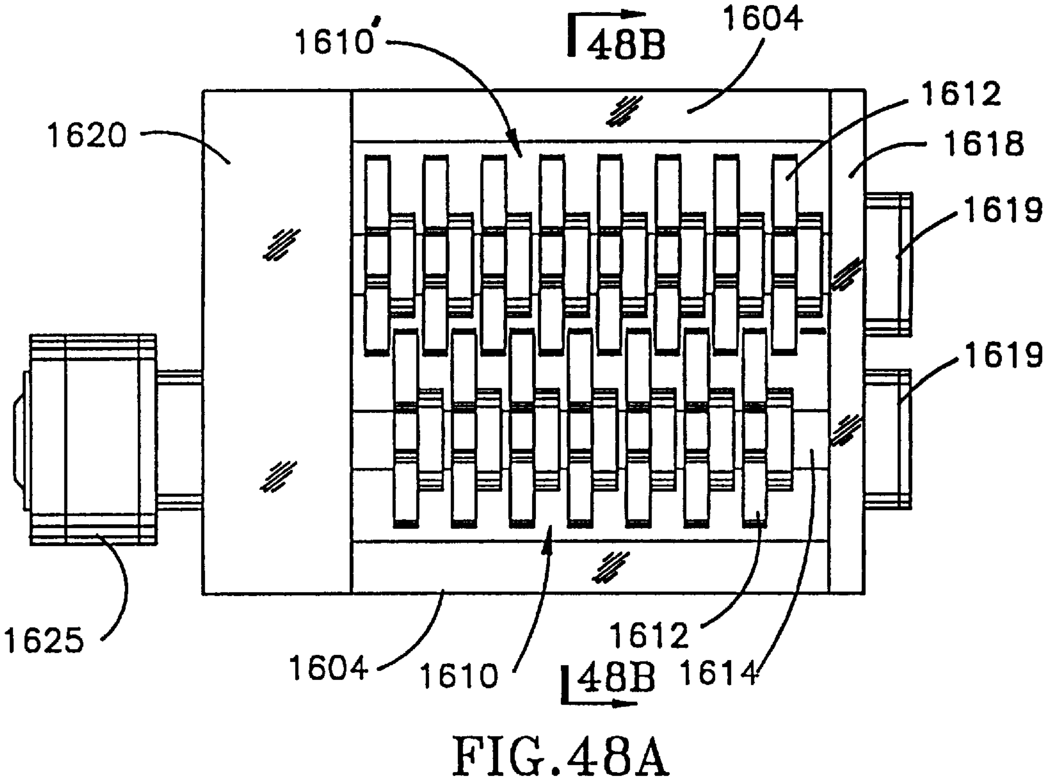
FIG. 48A is a top view of a star feeder system.

FIG. 48A shows that the star feeder system 1600 contains the head member gear box 1620 which rotates the star rotor assemblies 1610,1610' towards one another. The star feeder driver 1625 is mounted on the feeder frame includes the head member gear box 1620 and the head member gear box, the side frames 1604 and the bearing end frame 1618. The star rotor assemblies 1610, 1610' comprising hubs having star shaped feeding fingers 1612 and shaft assemblies 1614 are rotatably suspended between the gear box 1620 and end frame member 1618 which includes bearing housings 1619."

Figure 48B:
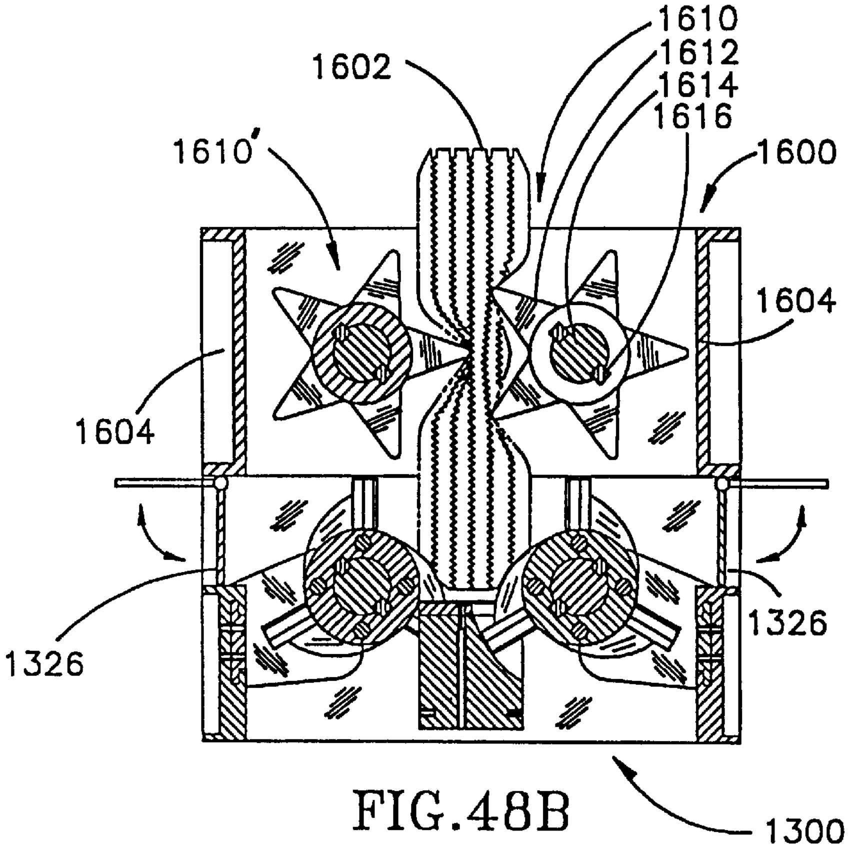
FIG. 48B is a cross-sectional drawing of a star feeder system for a rotary shredder taken along sight line 48B—48B in FIG. 48A.

FIG. 48B is a cross-sectional drawing which illustrates the function of the star feeder system 1600 for both single and dual rotor coarse shredders 1200, 1300. The star feeder system 1600 is composed of dual shafts of intermeshing and star shaped feeding fingers 1612 which rotate towards one another. Each shaft 1614 transmits its torque to the feeding fingers 1612 through key 1616. A series of feeding fingers is mounted on a common hub which is in turn mounted on the shaft 1614. A series of feeding fingers 1612 is stacked across the length of the feeding shaft. The feeding fingers on the second shaft 1610 are assembled identically except that the feeding fingers 1612 are staggered on the second shaft so that they intermesh with the fingers 1612 on the first shaft. Both shafts are driven so that the shafts rotate towards one another at the same speed. The shafts are supported in a housing generally defined by two side frames 1604 a gear box 1620 and an end member.

In practice, material such as a waste tire 1602 is dropped by gravity into the star feeder. The star feeder is mounted directly above the coarse shredder 1300 so that it can force material into the shredding chamber that normally would not self feed. As the feeder shafts rotate towards one another, the tire 1602 or other such waste material would begin to deform and be pulled into space between the two feeder shafts. As feeder shaft rotation continues, the tire 1602 would begin to enter the shredding chamber below the star feeder 1600 where it would be force fed and continuously reduced. This process would continue until the entire tire 1602 or other such waste is consumed by the coarse shredder 1300. A second tire fed behind the first provides a way to force feed the remnant of the first tire into the shredder 1300. Unprocessable material may be encountered during the feed cycle. When this occurs, the shredder will reverse direction and the star feeder shafts will stop. The appropriate reject door 1326 will open and the unprocessable item will be rejected from the coarse shredder 1300. Afterwards, as described above the reject door will close and the shredder rotor and the star feeding fingers 1612 will both proceed forward in counter rotation.

Figure 49:
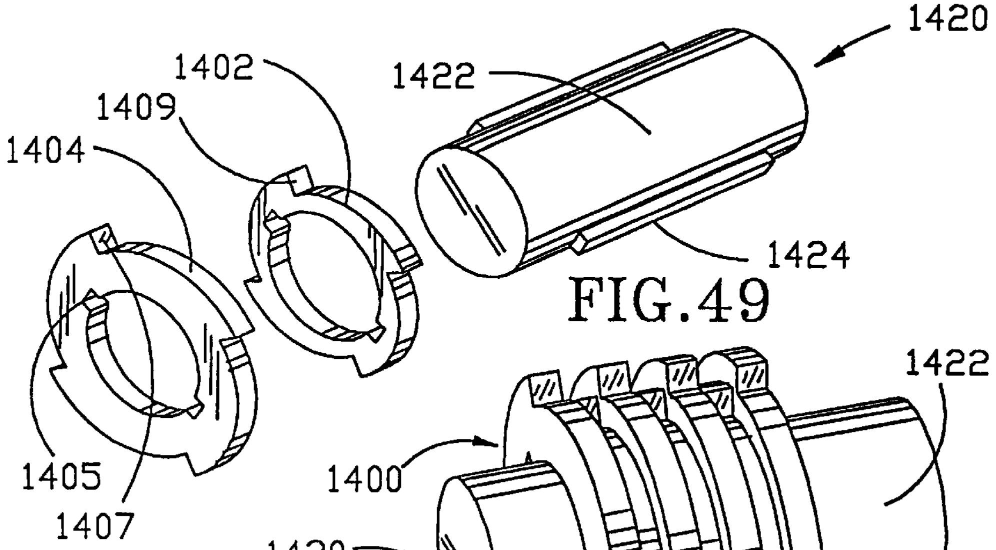
FIG. 49 is a perspective view of a partial shaft and disk used as an alternate embodiment of a rotary shredder, rotor using two different diameter cutting disks.
Figure 50:
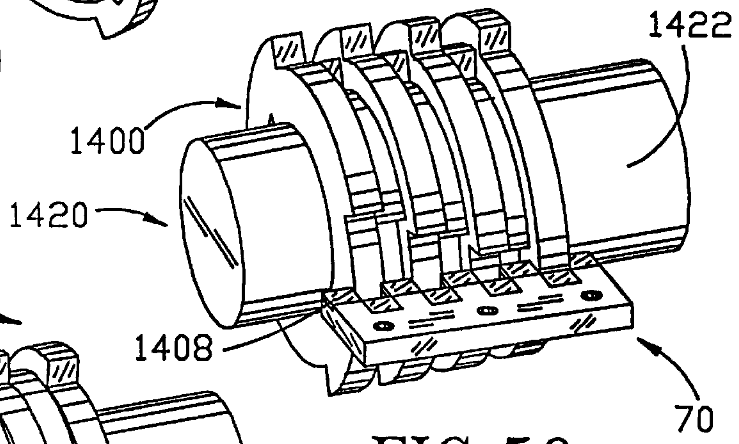
FIG. 50 is a perspective view of an alternate rotor and anvil assembly.
Figure 54:
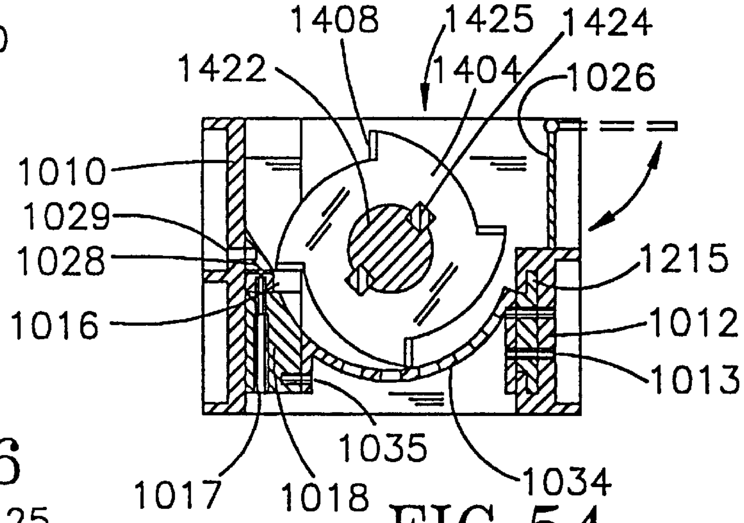
FIG. 54 is a cross-sectional view of the shredder shown in FIG. 53 taken along section lines 54—54.

FIG. 49 illustrates an alternate method of assembling a fine rotary shredder rotor assembly 1400 as seen in FIG. 50 using two different size cutting disks. The larger diameter cutting disk 1404 is slightly narrower than the width of the anvil assembly 70 indention seen in FIG. 50 so that the cutter will successfully pass through the anvil assembly 70 with approximately 10/1000th of a inch clearance on the front and sides of the cutter. The smaller diameter disk 1402 is sized to pass within 10/1000th of an inch from the front face of the anvil assembly 70. Both the small diameter disk 1402 and the large diameter cutting disk 1404 are configured with one or more teeth 1407 in its radial face. A series of small diameter disks 1402 and the large diameter cutting disks 1404 are alternately stacked on a common rotor shaft assembly 1420 to form the familiar pattern of the rotary shredder described herein. Shaft torque is passed from the shaft 1422 to the small diameter cutting disk 1402 and large diameter cutting disk 1404 through a pair of key slots 1405 milled into the shaft 1422. The shaft slots are filled with a pair of keys 1424 which also fit in the rectangular slots 1405 formed into the bore of the cutter. In this way shaft torque is transmitted to the front face of each cutter disk. An alternate means for transmitting the shaft torque may be accomplished by using a shaft having a hexagonal of other geometric cross-section as shown in FIG. 27–20. The use of shaft keys 1424 may be omitted when geometric shaft cross-sections are used. The cutters may be mounted to the shaft by compressing the cutter 1402 and 1404 together against a shaft shoulder using a jam nut or a clamping ring previously described and illustrated in FIG. 45. The cutting disks 1402, 1404 are typically made from high carbon alloy steel and hardened to improve wear properties. Wear inserts 1408 may also be imbedded into the front face of each tooth 1407 of the cutting disk as seen in FIG. 54.

FIG. 50 illustrates the rotor and anvil assembly formed from using the shaft assembly 1420 of FIG. 49 assembly 1400 together with a typical anvil assembly 70. One can see the familiar rotary shredder configuration which provides shearing action as material is caught between the rotating rotor teeth 1407 and the stationary anvil 70. With this configuration, shearing occurs along the anvil indentations as well as along the anvil's leading edge wear inserts 1408. The larger cutters pass through the anvil indentations allowing cutting on three sides while the smaller diameter cutters 1402 pass along the leading edge of the anvil assembly 70. Since cutter disk 1402,1404 having cutting teeth 407,1409 present and stacked adjacently along each position of the rotor's length, no cleaning fingers 1220 as seen in FIG. 39 may be used with this configuration.

Figure 51:
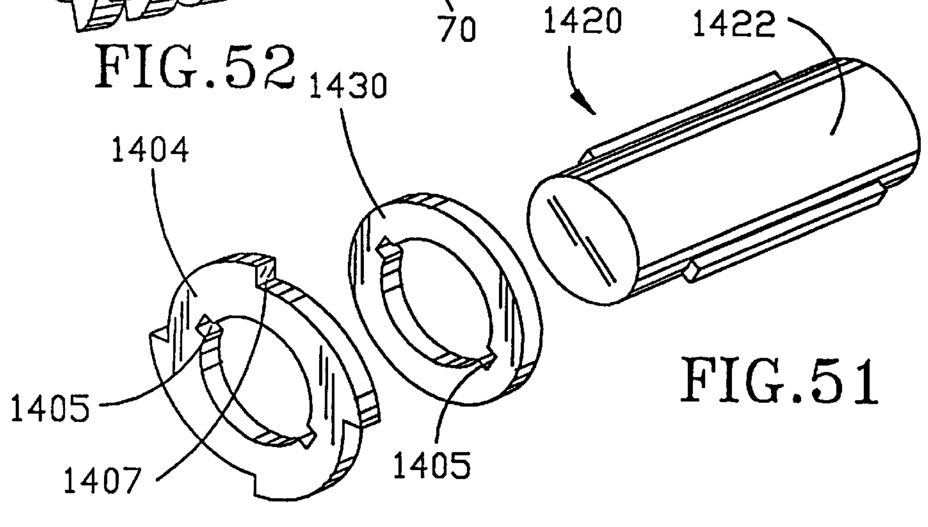
FIG. 51 is a perspective illustration showing an alternate embodiment for a rotor arrangement using alternate spacers and cutting disks.

FIG. 51 illustrates an alternate method of assembling a fine rotary shredder rotor using alternating cutting disks 1404 and spacers 1430. The cutting disk 1404 are slightly narrower than the width of the anvil assembly 70 indention shown in FIG. 52 so that the cutting disk 1404, as in FIG. 50, will successfully pass through the anvil 70 with approximately 10/1000th of a inch clearance on the front and sides of the cutter 1404. The a spacer disk 1430 now replaces the small cutter disk 1402, illustrated in FIG. 50, and is sized to pass within 10/1000th of an inch from the leading edge of the anvil assembly 70 wear inserts 1408 while its width provides proper spacing between cutting disk 1404 to pass through the anvil 70. A series of cutting disks 1404 and spacers 1430 are alternately stacked on a common rotor shaft assembly 1420 to form the familiar pattern of the rotary shredder as illustrated in FIG. 53. Shaft torque is passed from the shaft assembly 1420 to the cutter assembly 1425 in the same manner as described in FIG. 49. The cutters may be mounted to the shaft by compressing the cutter assembly 1425 together against a shaft shoulder using a jam nut or a clamping ring previously described in FIG. 45. The cutting disks 1402 are typically made from high carbon alloy steel and hardened to improve wear properties. Wear inserts 1408 may also be imbedded into the front face of each tooth 1407 of the cutting disk 1404 seen in FIG. 54.

Figure 52:
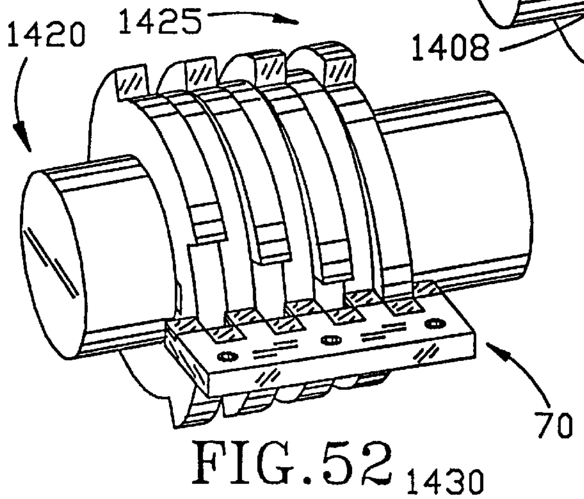
FIG. 52 is a perspective view of the rotor of FIG. 51 and its anvil assembly.
Figure 53:
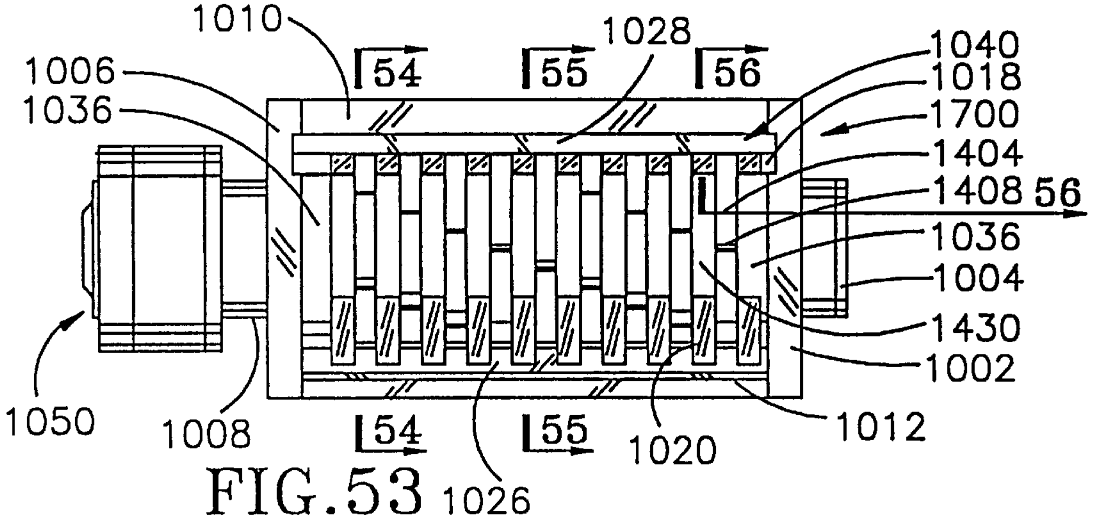
FIG. 53 is a top view of a single rotor rotary shredder assembly using cutting disks and spacers seen in FIG. 52 to form the rotor.

FIG. 52 illustrates the rotor 1420 and anvil assembly 70 formed from using the shaft assembly 1420 and rotor assembly 1425 of FIG. 51 together with a typical anvil assembly 70. One can see the familiar rotary shredder configuration which shears as material is caught between the rotating rotor teeth 1407 and the stationary anvil assembly 70. With this configuration, shearing occurs only along the anvil indention's. The cutter's teeth 1407 pass through the anvil indention's while the spacers pass along the leading edge of the anvil 70 thereby preventing the passage of unshreded material. Cleaning fingers 1220 as seen in FIG. 39 may be used with this configuration in conjunction with spacers 1430 which are present alternately with the cutter disk 1404 along the rotor assembly 1420.

Figure 55:
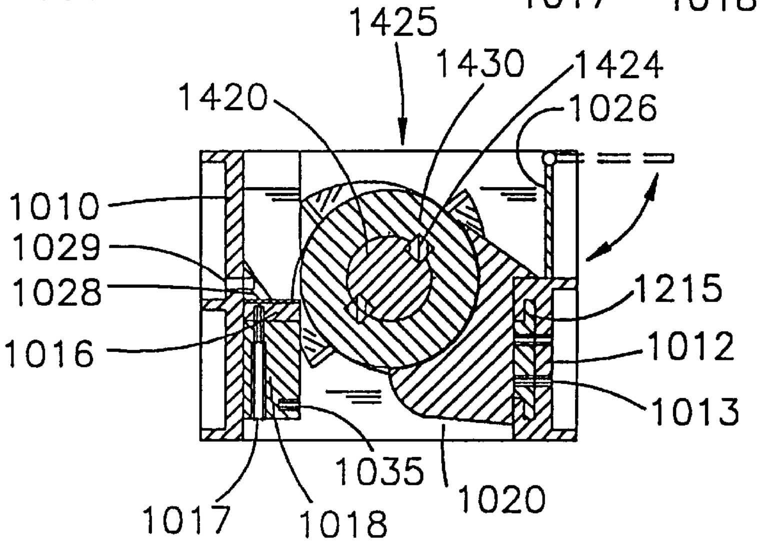
FIG. 55 is a cross-sectional view of the shredder shown in FIG. 53 taken along section lines 55—55.

FIG. 53 illustrates the top view of a single rotor shredder configuration 1700 equipped with alternating cutting disks and rotor assemblies 1425 seen in FIG. 52 to form a fine shredder. The rotor assembly 1425 is composed of alternating cutting disks 1404 and spacers 1430 which are sandwiched between two rotor end pieces 1036 on rotor shaft 1422 as seen in FIG. 54. The cutting disks 1404 are equipped with replaceable wear inserts 1408 along the leading edge of each tooth to extend the service life of the cutting disk 1404. The rotor assembly 1425 is held in position by bearings 1066, 1076 inside housings 1008 and 1004 and caused to rotate towards the anvil assembly 1040 by the hydraulic motor 1050. A mechanical drive utilizing an electric motor and gear box 1914 seen in FIG. 61 may be used to drive the rotor in lieu of a hydraulic motor 1050 if desired. Frame members 1006 and 1002 form the end housings and members 1010 and 1012 form the side frames. FIGS. 53 and 55 also shows cleaning fingers 1020 mounted to the side frame 1012 on the side opposite the anvil assembly 1040. It also shows the reject door 1026 which will open to allow the removal of an unprocessable item.

In practice, the shredder motor 1050 may encounter an item which it cannot shear. In this event the shredder would automatically stop and reverse direction upon exceeding a preset torque threshold delivered to the shredder rotor 1425. Upon reversing, the reject door 1026 would open. As the rotor reversed direction, the cutting disk teeth 1404 would lift an unshreddable item off of the anvil assembly 1040 and convey it towards the reject door 1026. The configuration of the cleaning fingers 1020 prevents the item from falling through the shredder 1700 between the rotor assembly 1425 and the side frame member 1012 and provides for a downhill path to the reject door as the item leaves contact with the rotor.

FIG. 54 shows a cross-section of the rotary shredder shown in FIG. 31 along section lines 54 FIG. 54 shows side frames 1010 and 1012 along with rotor assembly 1425, anvil bed plate 1018, anvil insert 1016, anvil deflection bar 1028, and optional screen 1034. The cross section shows an alternate means of transmitting shaft torque from drive shaft 1420 to rotor cutters 1404 and spacers and 1430 respectively through shaft keys 1504 in lieu of using a hexagonal as seen in or other geometric shaft cross-section seen in FIG. 27–30. The figure illustrates the mounting of cutting disks 1404 to the rotor shaft 1420 as well as the mounting of the anvil insert 1016 to the anvil bed plate 1018 via bolts to bed-plate 1018 with bolts 1017. The figure also illustrates the mounting of an optional screen 1034 to the shredder frame 1012 via bolts 1013 and 1017. Reject door 1026 is shown in its closed position and it is represented by dashed lines in its open position. The reject door may be mechanically or hydraulically operated. The anvil reflection bar 1028 is mounted to the shredder frame 1010 via bolts 1029 and its function is to force material into the path of the rotor teeth 1408 as the material begins to wedge against the side frame 1010. The optional screen 1034 is used only if it is necessary to reduce the particle size smaller than that produced by the teeth passing through the anvil. When configured with screens 1034, the rotary shredder is typically described as a granulator. With the granulator configuration, cleaning fingers 1020 may not be required or may be removed.

FIG. 55 shows a cross-section of the rotary shredder shown in FIG. 53 along section lines 55. This section is drawn through a typical cleaning finger 1020 in the shredder 1700 to illustrate the typical cross section of cleaning finger 1020. The cleaning finger is sloped on the top to facilitate the movement of reject material to the reject door 1026. One end of the cleaning finger is located within close proximity to the rotor for a minimum of 60 degrees of arc length to provide control over the rotor's deflection. The cleaning fingers 1020 may be mounted to the side frame 1012 via bolts 1013. In some situations, the cleaning fingers 1020 may not be bolted in place but rather left to freely float in the retaining pocket 1215 formed in the shredder side frame member 1012. Typically, the cleaning fingers 1020 are located in the empty spaces between cutting disks 1404 formed by spacers 1430 as seen in FIGS. 53 and 55.

Figure 56:
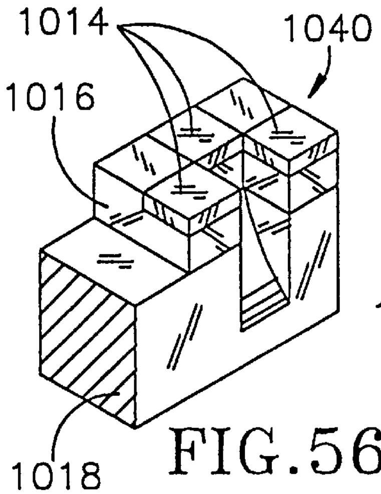
FIG. 56 is a perspective view of the anvil shown in FIG. 53 taken along section lines 56—56.

FIG. 56 is the rotary shredder anvil assembly 1040 shown in FIG. 53 along section lines 56. The figure illustrates the typical construction of the anvil where a series of anvil inserts 1016 are mounted to the anvil bed plate 1018. Wear inserts 1014 such as tungsten carbide are embedded in the anvil insert 1016 using screws or silver solder on all sides of the tooth pocket formed in the anvil. This arrangement allows the anvil inserts to be custom fitted to the rotor teeth, section by section, and it also provides for a simple method of replacing worn components. Use of tungsten carbide wear inserts 1014 greatly extends the operating life of the components.

Figure 57:
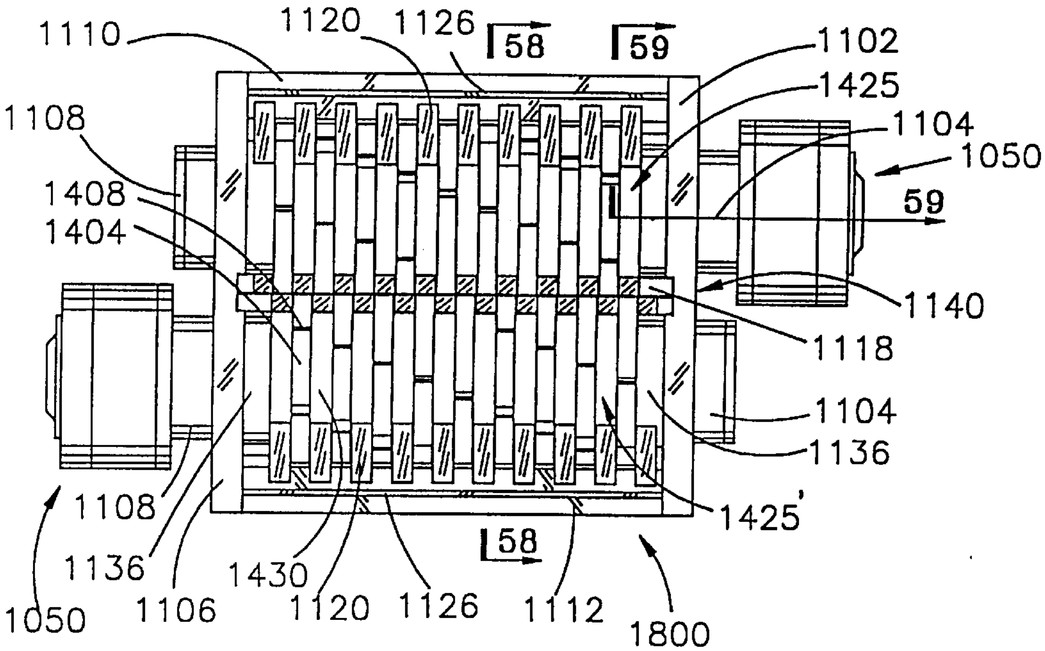
FIG. 57 is a top view of a dual rotor shredder assembly configured using alternating cutting disks and spacers as seen in FIG. 52 to form the rotor.

FIG. 57 illustrates the top view of a dual rotor shredder 1800 equipped with alternating cutting disks and spacer disk 1430 to form a fine shredder. The rotor assembly 1425 is composed of alternating cutting disks 1404 and spacers 1430 which are sandwiched between two rotor end pieces 1136 on rotor shaft 1422. The cutting disks 1404 are equipped with replaceable wear inserts 1408 along the front face of each tooth to extend the service life of the cutters. The rotor assembly 1425 is held in position by bearings inside housings 1108 and 1104 and it is caused to rotate towards the anvil assembly 1140 by hydraulic motor 1050. A mechanical drive utilizing an electric motor and gear box 1901 seen in FIGS. 63 and 65 may be used to drive the rotor in lieu of a hydraulic motor 1050 if desired. The second rotor assembly 1425' is constructed identical to the first rotor 1425. During operation, both rotors rotate towards one another and their teeth pass through a common anvil assembly 1140. Frame members 1106 and 1202 form the end housing members and members 1110 and 1112 form the sides. FIG. 57 also shows cleaning fingers 1120 may be mounted to the side frame member 1110 and 1112. It also shows the reject doors 1026 located above each side frame which will open to allow rejection of any unprocessable material.

In practice, the shredder may encounter material which it cannot shear. In this event the motors 1050 would automatically stop and reverse direction upon exceeding a preset torque threshold delivered to the shredder rotor. Upon reversing, the reject door 1126 would open. As the rotor reversed direction, its cutting disk teeth 1404 would lift an unshreddable material off of the anvil assembly 1140 and covey it towards the reject door 1126. The configuration of the cleaning fingers 1120 prevents the item from falling through the shredder between the rotor assembly 1425 and side frame members 1010,1012 and it provides for a downhill path to the reject door as the item leaves contact with the rotor. In this instance having two hydraulic drives, each rotor 1425 may operate and reject material independently. However, with direct mechanical drives, as seen in FIG. 63 both shafts may be driven through a common gear box so that both rotors reject material, if either one of them encounters an unshreddable item.

Figure 58:
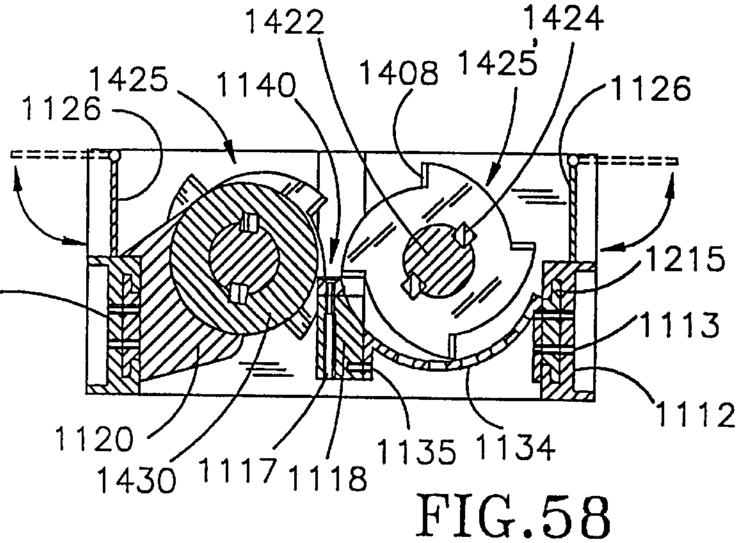
FIG. 58 is a cross-sectional view of the shredder shown in FIG. 57 taken along lines 58—58.

FIG. 58 is a cross-section of the rotary shredder shown in FIG. 57 along section lines 58. FIG. 58 shows side frame members 1110 and 1112 along with rotors 1425 and 1425', anvil bed plate 1118, anvil insert 1116, and optional screen 1134. The cross section shows an alternate means of transmitting shaft torque from drive shaft 1422 to rotor cutting disk 1404 through shaft keys 1504 in lieu of using a hexagonal or other geometric shaft cross-section. The figure illustrates the mounting of cutting disks 1404 to the rotor as well as the mounting of the anvil insert 1116 to the anvil bed plate 1118 via bolts 1117. This figure also illustrates the mounting of an optional screen 1134 to the shredder frame 1112 via bolts 1113 and to the anvil bed plate via bolts 1135. Reject doors 1126 are shown in their closed position and they are represented by dashed lines in their open position. The reject doors 1126 may be mechanically or hydraulically operated. The optional screen 1034 is used only if it is necessary to reduce the particle size smaller than the material size produced by the teeth passing through the anvil. When configured with screens 1034, the rotary shredder is typically described as a granulator. Cleaning fingers 1120 may not be required for the granulator configuration since the particle size generally feed to a granulator is usually much smaller.

Section 58 is drawn through a typical cleaning finger 1120 in the shredder 1800 to illustrate the typical cross section. The cleaning finger 1120 is sloped on the top to facilitate the movement of reject material to the reject door 1126. It is located within close proximity to the rotor spacer member 1430 for a minimum of 90 degrees of arc length to provide control over rotor deflection. Cleaning fingers 1120 may be mounted to the side frame 1112 via bolts 1113. In some situations, the cleaning fingers 1120 may not be bolted in place but rather left to freely float in the retaining pocket 1215 formed in the shredder side frame member 1112.

Figure 59:
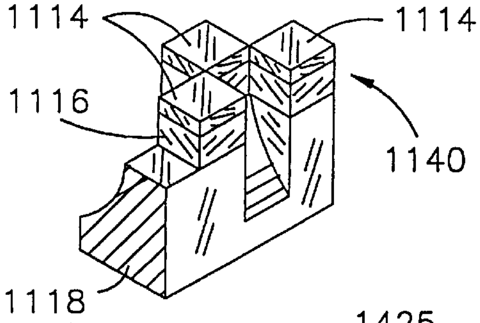
FIG. 59 is a perspective view of the anvil in FIG. 57 taken along section line 59—59.

FIG. 59 illustrates the rotary shredder anvil assembly 1140 shown in FIG. 35 along section lines 59. FIG. 59 illustrates the typical construction of the anvil where a series of anvil inserts 1116 are mounted to the anvil bed plate 1118 via bolts 1117. Wear inserts 1114 such as tungsten carbide are embedded in the anvil insert 1116 using screws or silver solder on all sides of the tooth pocket formed in the anvil. This arrangement allows the anvil inserts 1116 and its wear inserts 1114 to be custom fitted to the rotor teeth 1408, section by section, and it also provides for a simple method of replacing worn cutting disk 1404 components. Use of tungsten carbide wear inserts 1114 greatly extends the operating life of the components. FIG. 58 also illustrates the operating principle of the dual rotors 1425 and 1425' passing through a single anvil assembly 1140. With this configuration, the dual rotor machine continuously clears the space between the rotors as the rotor teeth pull material towards the anvil. Notice that the teeth on the first rotor 1425 are aligned to intermesh with the teeth on the second rotor 1425'. In this way, material may be reduced by tooth-to-tooth action between the rotors 1425 and 1425' as well as tooth-to-anvil action. This configuration also tends to be self feeding since both rotors rotate towards one another thereby compressing and pulling additional material towards the anvil assembly 1140.

Figure 60:
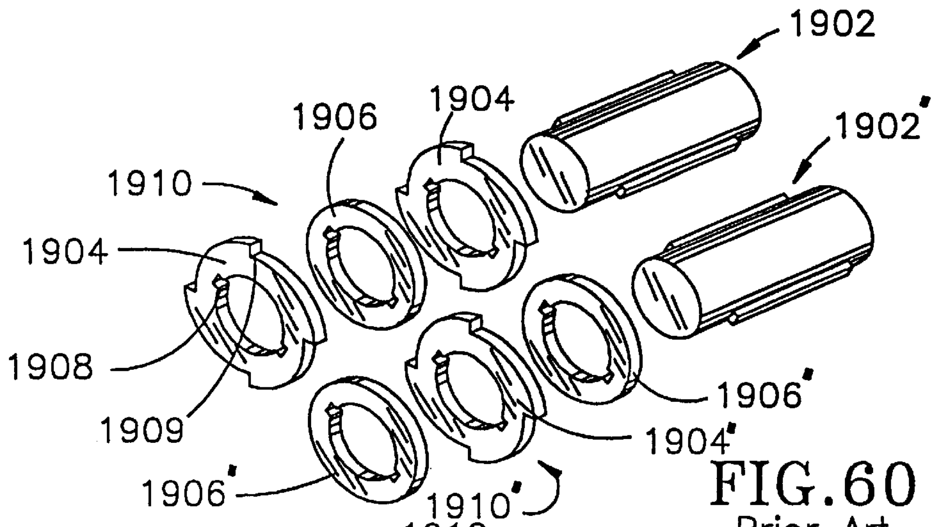
FIG.60 Prior Art
FIG. 60 is a perspective view showing the arrangement of cutting disks and spacers on the dual shafts of a typical rotary shredder.

FIG. 60 illustrates the construction of a typical shear shredder having no anvil as opposed to the rotary shredders previously discussed. Referring to the FIG. 61, cutting disks 1904 are alternately stack with spacers 1096 on shaft assembly 1902 to form a rotor assembly 1910. The cutting disks 1904 are configured with one or more teeth 1909 in its radial face. Torque is typically transmitted to the cutting disks 1904 through the use of a key and key slot 1908, but a hexagonal or other geometric shaft cross-section may also be used thereby eliminating the need for shaft keys. An identical rotor assembly 1910' is configured in the same manner with the exception that a spacer on shaft 1902 opposes a cutter on shaft 1902'. With this arrangement, the cutting disks 1904 on rotor 1910 are allowed to intermesh with the cutting disks on rotor 1910'. In normal operation, the two rotors are caused to rotate towards one another. Material is first grabbed by the teeth or hooks 1909 formed on the disk cutters 1904 and 1904' and then pulled into the intermeshing area between rotors. Material is sheared as one disk cutter 1904 pulls material against the sides of the opposing disk cutters 1094' thereby cutting the material in a fashion similar to the cutting of paper with scissors.

Figure 61:
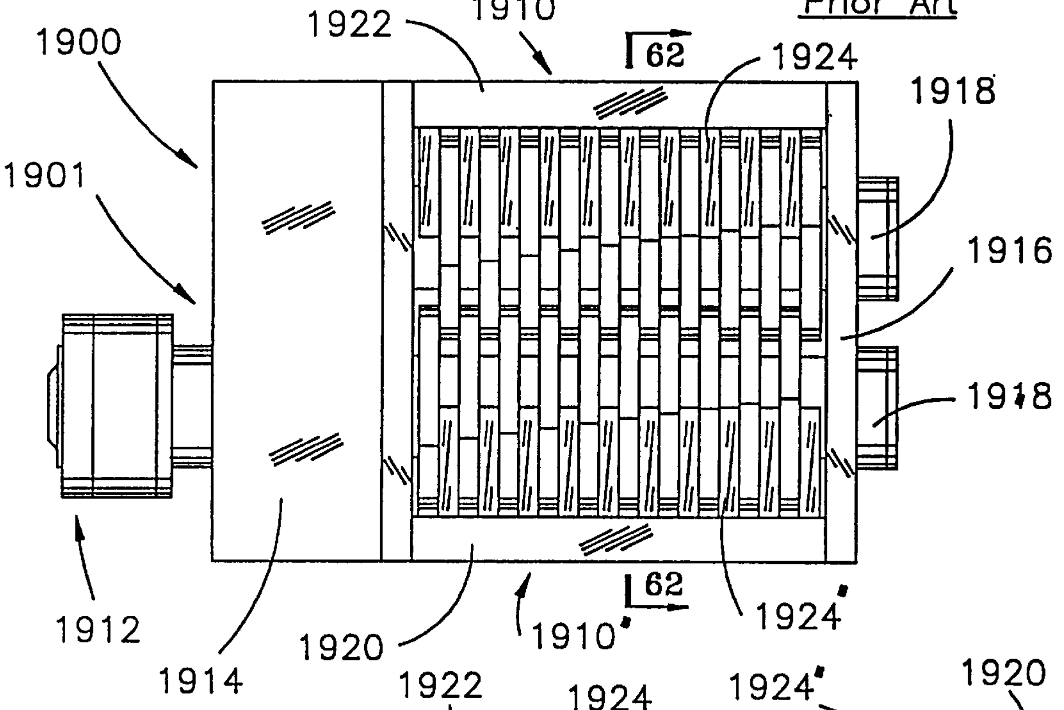
FIG.61 Prior Art
FIG. 61 shows the top view of a typical shear shredder.

FIG. 61 shows the top view of a typical shear shredder 1900 which utilizes the rotors 1910 and 1910' illustrated in FIG. 60. Rotors 1910 and 1910' are shown to be mounted in a drive assembly 1901 composed of motor 1912, gear box 1914, side frames 1920 and 1922, end frame 1916, and rotor bearing housings 1918 and 1918'. Cleaning fingers 1924 and 1924' are shown to be positioned in between each cutter disk and mounted to the drive assembly. In operation, drive motor 1912 causes both rotors 1910 and 1910' to rotate towards one another through gear box 1914 at approximately 30 to 50 RPM. Usually, rotor 1910 is geared to rotate at a slightly different RPM from rotor 1910' to improve performance. Each rotor may also be directly driven by a hydraulic motor in lieu of using the gear box, but the gear box version will serve to illustrate the general function of a shear shredder.

Figure 62:
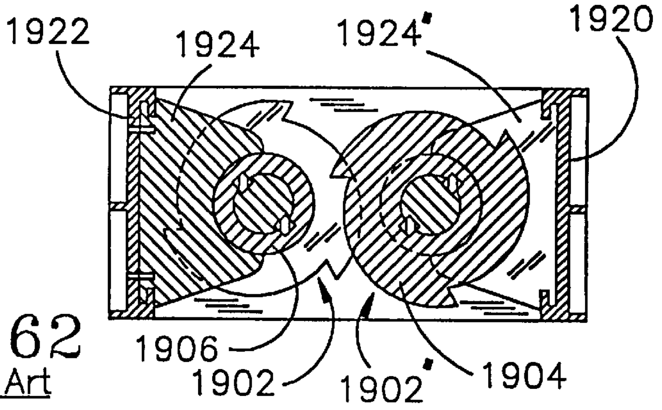
FIG.62 Prior Art
FIG. 62 is a cross-sectional drawing of the shear shredder shown in FIG. 61 taken along section lines 62—62.

FIG. 62 is a cross-section drawing of the shear shredder shown in FIG. 61 drawn along section line 62. The drawing clearly illustrates the operating principle of the shear shredder where cutting disks 1904 on each rotor intermesh and oppose a spacer 1906 on the opposing rotor. Shaft 1902 and 1902' are located so that the cutter intermeshing can occur. Cleaning fingers 1924 and 1924' are shown mounted to side frames 1922 and 1920 respectively. They confine shaft deflection by enclosing the spacers 1906 a minimum of 90 of arc length. The cleaning fingers also clear material from the spaces between cutting disks 1904.

Figure 64:
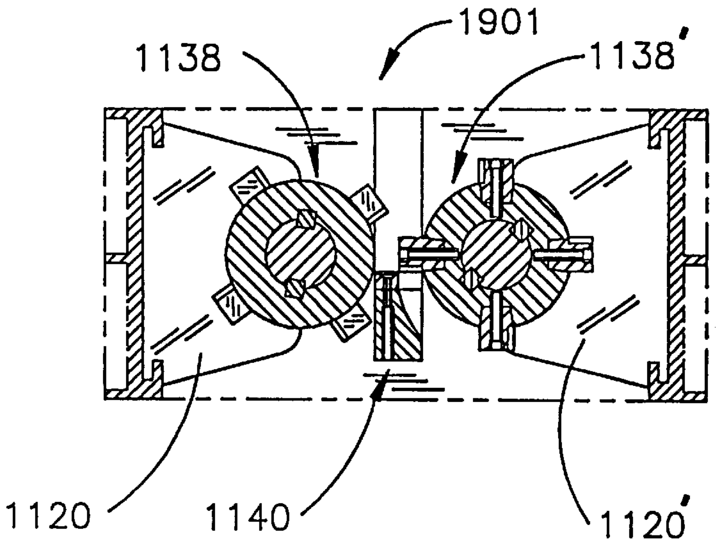
FIG. 64 is a cross-section of the shredder taken along section line 64—64 in FIG. 63.

FIG. 63 illustrates the conversion of a typical shear shredder shown in FIGS. 60 through 62 to a fine rotary shredder using rotor segments seen in FIG. 8 having removable teeth. FIG. 63 is a top view of the converted shear shredder which utilizes the shear shredder 1900 drive assembly 1901 (shown in phantom). The shear shredder is converted to a rotary shredder by removing the disk cutters 1904 and spacers 1906 from the dual shafts 1902,1902' and replacing them with rotary shredder rotor assemblies 1138 and 1138' best seen in FIG. 36. The addition of an anvil assembly 1140 and cleaning fingers 1120 and 1120' best seen in FIG. 36 complete the conversion. FIG. 64 is a cross-section drawing of the converted shredder illustrated in FIG. 63 drawn along section line 64. FIG. 64 illustrates the familiar arrangement of the shredder duel rotor assemblies 1138 and 1138' in drive assembly 1901 with anvil assembly 1140 located between the rotors. Cleaning fingers 1120 and 1120' limit shaft deflection and clean material from the rotor. This converted machine will operate identically to the one described in FIGS. 35 through 37.

Figure 66:
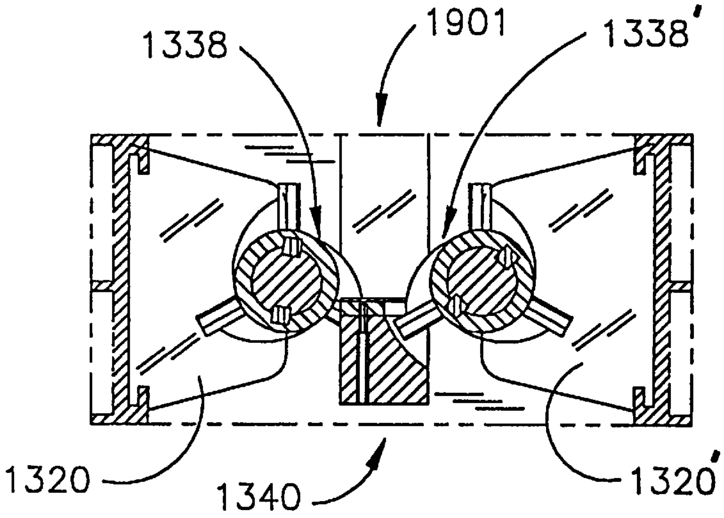
FIG. 66 is a cross-sectional drawing of the shredder taken along section line 66—66 in FIG. 65.

FIG. 65 illustrates the conversion of a typical shear shredder 1900 shown in FIGS. 60 through 62 to a coarse rotary shredder using rotor segments seen in FIG. 23 having integral teeth. FIG. 65 is a top view of the converted shear shredder which utilizes the shear shredder drive assembly 1901 (shown in phantom). The shear shredder is converted to a rotary shredder by removing the disk cutters 1904 and spacers 1906 from the dual shafts 1902, 102' and replacing them with rotary shredder rotor assemblies 1338 and 1338' best seen in FIG. 43. The addition of an anvil assembly 1340 and cleaning fingers 1320 and 1320' complete the conversion. FIG. 66 is a cross-section drawing of the converted shredder illustrated in FIG. 65 drawn along section line 66. FIG. 65 illustrates the familiar arrangement of the shredder rotor 1338 and 1338' in drive assembly 1901 with anvil assembly 1340 located between the rotors. Cleaning fingers 1320 and 1320' limit shaft deflection and clean material from the rotor. This converted machine will operate identically to the one described in FIGS. 42 through 44.

Figure 67:
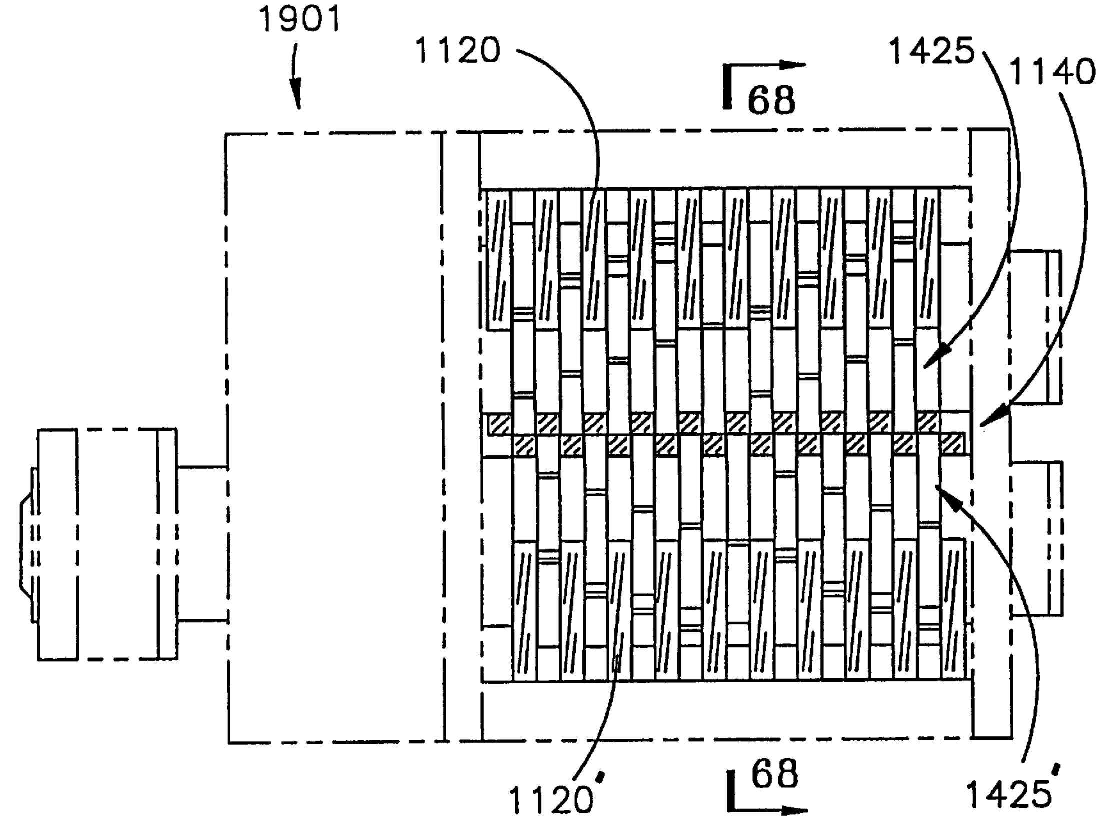
FIG. 67 is a top view of a typical shear shredder converted to a fine rotary shredder using alternating cutting disks and spacers.
Figure 68:
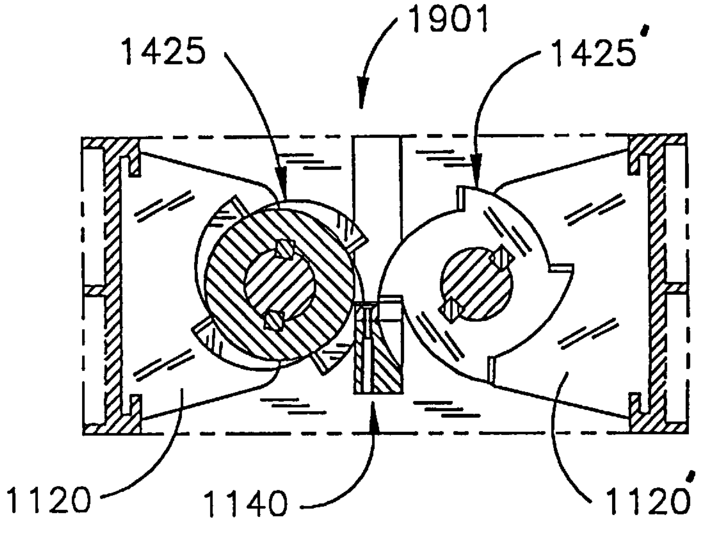
FIG. 68 is a cross-section of the shredder taken along section line 68—68 in FIG. 67.

FIG. 67 illustrates the conversion of a typical shear shredder shown in FIGS. 60 through 62 to a fine rotary shredder using alternating disk cutters and spacers. FIG. 67 is a top view of the converted shear shredder which utilizes the shear shredder drive assembly 1901 (shown in phantom). The shear shredder is converted to a rotary shredder by removing the disk cutters 1904 and spacers 1906 from the dual shafts 1902,1902' shown in FIG. 60 and replacing them with rotary shredder rotor assemblies 1425 and 1425' seen in FIG. 52. The addition of an anvil assembly 1140 and cleaning fingers 1120 and 1120' also best seen in FIG. 36 complete the conversion. FIG. 68 is a cross-section drawing of the converted shredder illustrated in FIG. 67 drawn along section line 68. It illustrates the familiar arrangement of the shredder rotor 1425 and 1425' in drive assembly 1901 with anvil assembly 1140 located between the rotors. Cleaning fingers 1120 and 1120' limit shaft deflection and clean material from the rotor. This converted machine will operate identically to the one described in FIGS. 57 through 59.

Figure 69:
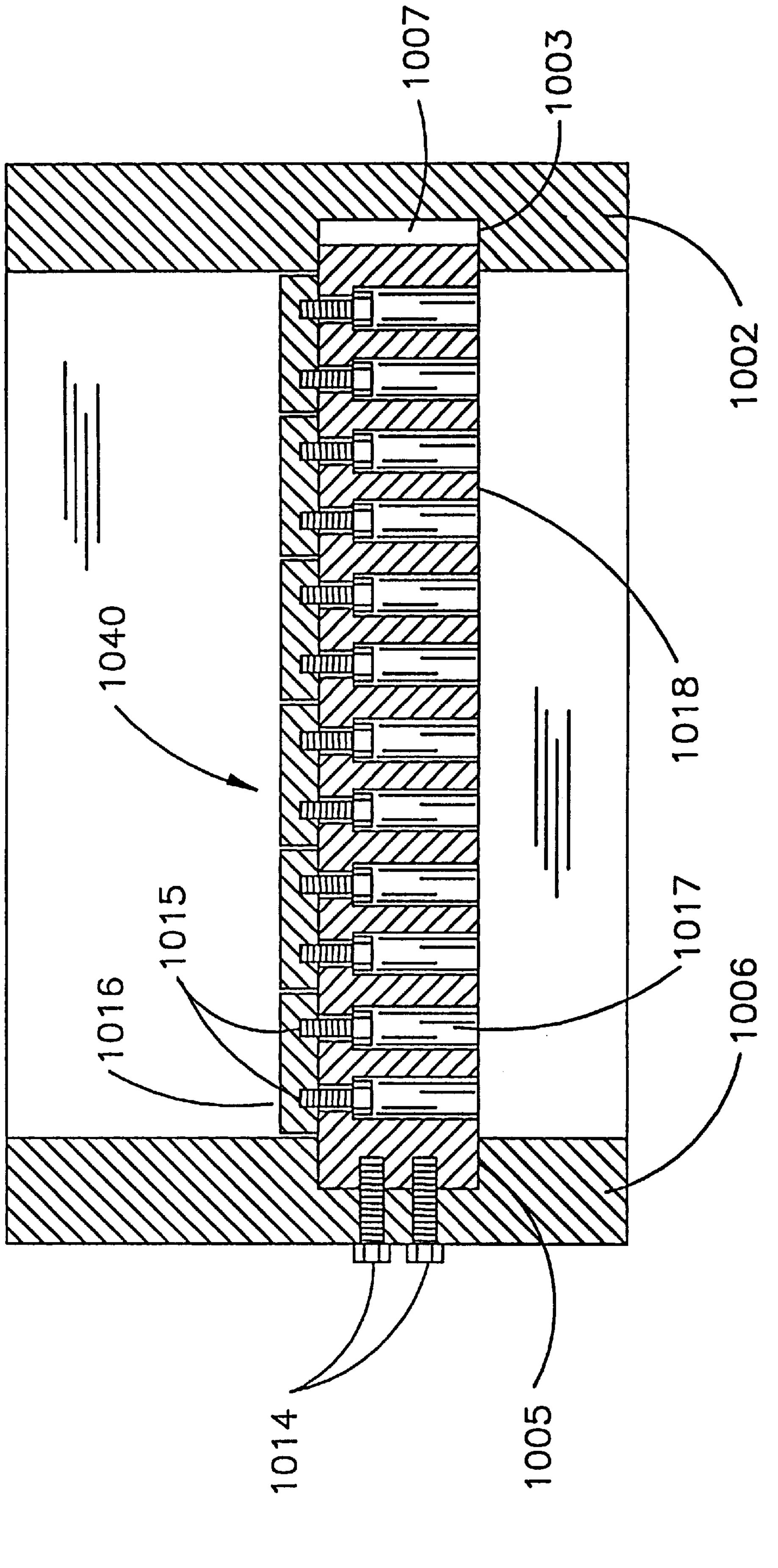
FIG. 69 is a cross-section of the shredder depicted in FIG. 31.

As seen in FIG. 69 the anvil assembly 1040 typical of FIG. 31 and generally applicable to FIGS. 35, 38 and 42, comprising the anvil bed plate 1018 and the insert holder or wear plates 1016. The wear plates are attached to the anvil with screws 1015 via holes 1017 recessed into the anvil bed plate 1018. The anvil assembly 1040 as seen in FIG. 69 is secured within a notch 1003, 1005 in head and foot frame members 1002, 1006 located at each end. However, only one end of the anvil bed plate 1018 is secured to the head frame member 1006 via screws 1014 with he opposite end of the anvil bed plate 1018 remaining free to expand into the pocket 1007 in the foot end plate 1002. As discuss previously the rotor assembly 1038 as seen in FIG. 45 is allowed to expand in foot frame member 1002 via bearing housing 1004. Therefore, temperature expansion of the rotor assembly 1038 and the anvil assembly 1040 occurs simultaneously starting at their fixed points in the head frame member 1006 and extending into their respective recesses in the foot frame member 1002.

All single or dual rotary shredder assemblies depicted herein having anvils regardless of configuration of rotor or anvil configuration are conceivably mounted in a manner whereby the anvil and rotor assembly is free to expand longitudinal FIG. 69 is a cross-section illustration of how the anvil assembly 1040 including bed plate 1018 and its anvil inserts 1016 are typically configured relative to head members 1006 and foot member 1002. As seen in FIG. 69 one end of the anvil bed plate 1018 is recessed into a pocket 1005 in the head member 1006 and secured via bolts 1014. The opposite end of the anvil bed plate 1018 is then recessed into a pocket 1003 in the foot member 1002 and left unattached to allow for linear expansion in the space 1007 during operation. This arrangement allows the anvil bed plate 1018 and its inserts 1016 to maintain close tolerance with the rotor assembly shown in FIG. 45 throughout the expansion cycle since both are allowed to expand from a common point thereby maintaining a gap between the anvil wear insert and the rotor tooth of between 0.05 to 0.20 thousandths of an inch per foot of anvil and rotor length.

Because many varying and different embodiments may be made within the scope of the inventive concept herein taught and because many modifications may be made in the embodiments herein detailed in accordance with the descriptive requirement of the law, it is to be understood that the details herein are to be interpreted as illustrative and not intended to limit the invention.

What is claimed is:

1. A method for assembling a rotary type shredder comprising the steps of:

a) providing a reconfigurable rotary type shredder having an anvil assembly comprising:

i) a housing having head, foot and side frame members;

ii) at least one shredding rotor assembly rotatably suspended between said head and foot members, said shredding rotor assembly comprising a shaft and a plurality of one piece segmented modular hub assemblies having a plurality of oval shaped tapered pockets machined therein, each said modular hub slidable upon and removably secured to said shaft;

iii) a drive connected to said rotor assembly;

iv) an anvil member having notches for passing rotor teeth adjustably attached and supported by a bed plate, said bed plate fixedly attached to said head member and slidably attached to said foot member, and v) a plurality of cleaning fingers attached to at least one of said side frame members, located in close proximity to said hub assemblies;

b) configuring said rotor and anvil assemblies according to type of waste material to be shredded and granule size desired.

2. A method for assembling a rotary type shredder according to claim 1 wherein said method includes the step of providing and installing a plurality of interchangeable elongated, oval shaped tapered tooth modules in said oval shaped, tapered tooth pockets in said hub assemblies in a selected pattern, plugging any unused pockets with blank tapered tooth modules, and arranging said modular hub assemblies on said shaft in a selected pattern according to type of waste material to be shredded and size of granule desired.

3. A method for assembling a rotary type shredder according to claim 2 wherein said method includes the step of:

a) substituting a plurality of modular anvil insert holders adjustable relative to said bed plate, said holders having notches for passing said rotor tooth modules, and wear inserts secured thereto for said modular anvil; and b) adjusting said insert holders to correspond precisely with said tooth modules, in said selected pattern according to type of waste material to be shredded and size of granule desired.

4. A method for assembling a rotary type shredder according to claim 3 wherein said method includes the steps of:

a) anchoring one end of said shaft rotatably to said head member;

b) fixing one end of said anvil bed plate to said head member;

c) attaching said foot member to ends of said side frame members and to end of said bed plate and said shaft opposite said head member in a manner wherein said shaft and said bed plate are allowed to float longitudinally, thereby allowing thermal expansion of said rotor assembly and said anvil assembly to occur uniformly extending from said head member thus maintaining thermal expansion continuity with said anvil assembly; and d) adjusting tolerance between rotor tooth modules and anvil wear inserts to allow for difference in thermal expansion between said anvil and said tooth assemblies to a tolerance of between $0/1000$ to $20/1000$ of an inch per linear foot of rotor shaft length.

5. A method for assembling a rotary type shredder according to claim 1 wherein said method includes the step of preventing deflection of said rotor assembly by placing said cleaning fingers and anvil assemblies in close proximity to said hub assemblies.

6. A method for assembling a rotary type shredder according to claim 1 wherein said method includes the step of ejecting unshreddable material through a door in said frame members by opening said door and temporarily reversing rotation of said rotor assembly.

7. The method according to claim 1 further comprising the step of configuring said shredder as a hybrid having both fine and coarse shredding means within the same shredder and producing a variety of particle sizes and shapes by providing shredder modular components which are interchangeable and configurable for desired particle size, shape and throughput volume.

8. A method for assembling a rotary type shredder comprising the steps of:

a) providing a reconfigurable rotary type shredder having an anvil assembly comprising:

i) a housing having head, foot and side frame members;

ii) a shaft having a shoulder adjacent one end;

iii) a plurality of one piece, rotor hub members having a diametrical peripheral surface, said hub members slidably mounted upon said shaft;

iv) an adjustable shaft clamping located opposite said shoulder for securing said hub members in position upon said shaft and in compression against said shoulder; and c) attaching at least one said shaft to a drive;

d) installing at least one anvil assembly comprising:

i) a bed plate supported by said frame members;

ii) an anvil having notches therein for passing rotor teeth, adjustably attached to said bed plate to allow for tooth alignment; and e) arranging said hub assemblies on said shaft in a selected pattern according to type of waste material to be shredded and size of granule desired.

9. The method according to claim 8 further comprising the step of machining a plurality of oval shaped tapered pockets located in said peripheral surface of said modular hub members, installing a plurality of interchangeable oval shaped tapered tooth modules in said pockets in a selected pattern and plugging any unused pockets with blank tooth modules.

10. The method according to claim 8 further comprising the step of configuring said hub members in manner wherein each said hub member comprises a plurality of raised teeth transverse to direction of rotation and extending outwardly from said peripheral surface.

11. The method according to claim 10 further comprising the step of attaching a wear plate to each of said teeth.

12. The method according to claim 8 wherein said anvil is comprised of a plurality of individually adjustable anvil segments.

13. The method according to claim 12 further comprising the step of attaching a plurality of wear plates to each of said anvil segments.

14. The method according to claim 8 further comprising the step of inserting a spacer hub between each said rotor hub member.

15. The method according to claim 8 further comprising the step of providing and attaching holding means to said hub members for inserting a plurality of wear plates said wear plates arranged transverse to direction of rotation.

16. The method according to claim 8 wherein said anvil assembly further comprises an anvil deflection bar attached to said frame members above said anvil assembly.

17. The method according to claim 8 further comprising the step of ejecting unshreddable material through a door in said frame members by opening said door and temporarily reversing rotation of said rotor assembly.

18. The method according to claim 8 further comprising the step of configuring said shredder as a hybrid having both fine and coarse shredding means within the same shredder and producing a variety of particle sizes and shapes by providing shredder modular components which are interchangeable and configurable for desired granular size, shape and throughput volume.

* * * * *